(12) United States Patent
Ogasawara et al.

(10) Patent No.: US 9,815,330 B2
(45) Date of Patent: Nov. 14, 2017

(54) LAMINATE, TIRE, AND METHOD FOR PRODUCING TIRE

(75) Inventors: Takuya Ogasawara, Tokyo (JP); Hideyuki Chiashi, Tokyo (JP); Hideki Kitano, Tokyo (JP)

(73) Assignee: BRIDGESTONE CORPORATION, Chuo-Ku, Tokyo (JP)

( * ) Notice: Subject to any disclaimer, the term of this patent is extended or adjusted under 35 U.S.C. 154(b) by 315 days.

(21) Appl. No.: 14/123,127

(22) PCT Filed: May 30, 2012

(86) PCT No.: PCT/JP2012/064001
§ 371 (c)(1),
(2), (4) Date: Jan. 14, 2014

(87) PCT Pub. No.: WO2012/165512
PCT Pub. Date: Dec. 6, 2012

(65) Prior Publication Data
US 2014/0110032 A1  Apr. 24, 2014

(30) Foreign Application Priority Data

May 31, 2011 (JP) .................. 2011-122889
May 31, 2011 (JP) .................. 2011-122890
May 31, 2011 (JP) .................. 2011-122893

(51) Int. Cl.
*B60C 1/00* (2006.01)
*B60C 5/14* (2006.01)
(Continued)

(52) U.S. Cl.
CPC ............ *B60C 5/14* (2013.01); *B29D 30/0681* (2013.01); *B29D 30/20* (2013.01);
(Continued)

(58) Field of Classification Search
CPC ............ B60C 1/0008; B60C 5/00; B60C 5/14
See application file for complete search history.

(56) References Cited

U.S. PATENT DOCUMENTS 4,748,199 A   5/1988  Takiguchi et al.
5,040,583 A   8/1991  Lin et al.
(Continued)

FOREIGN PATENT DOCUMENTS

EP   1195402 A1   4/2002
EP   2045102 A1   4/2009
(Continued)

OTHER PUBLICATIONS

Machine translation of JP 2009-83537, 2009.*
(Continued)

*Primary Examiner* — Justin Fischer
(74) *Attorney, Agent, or Firm* — Sughrue Mion, PLLC

(57) ABSTRACT

The laminate according to the present invention includes a thermoplastic resin film-containing layer and a rubber layer, in which the rubber layer contains a modified diene polymer, and the rubber layer has a dynamic storage modulus E' at −20° C. of $1.0 \times 10^5$ to $1.0 \times 10^8$ Pa. This laminate can improve the resistance to the fractures and the cracks of the inner liner.

15 Claims, 4 Drawing Sheets

(51) Int. Cl.

| | | |
|---|---|---|
| *B29D 30/06* | (2006.01) | |
| *B29D 30/30* | (2006.01) | |
| *B29D 30/20* | (2006.01) | |
| *B32B 25/16* | (2006.01) | |
| *B32B 27/30* | (2006.01) | |
| *B32B 7/12* | (2006.01) | |
| *B32B 25/08* | (2006.01) | |
| *B32B 25/12* | (2006.01) | |
| *B32B 25/14* | (2006.01) | |
| *B32B 27/38* | (2006.01) | |
| *B32B 1/00* | (2006.01) | |

(52) U.S. Cl.
CPC ............ *B29D 30/3007* (2013.01); *B32B 1/00* (2013.01); *B32B 7/12* (2013.01); *B32B 25/08* (2013.01); *B32B 25/12* (2013.01); *B32B 25/14* (2013.01); *B32B 25/16* (2013.01); *B32B 27/306* (2013.01); *B32B 27/38* (2013.01); *B60C 1/0008* (2013.01); *B29D 2030/0682* (2013.01); *B32B 2250/05* (2013.01); *B32B 2307/54* (2013.01); *B60C 2005/145* (2013.01); *B60C 2005/147* (2013.01); *Y10T 428/269* (2015.01); *Y10T 428/31511* (2015.04)

(56) References Cited

U.S. PATENT DOCUMENTS

| | | | | |
|---|---|---|---|---|
| 5,158,627 A * | 10/1992 | Saneto | ................ | B60C 17/0009 152/510 |
| 5,992,486 A * | 11/1999 | Katsuki | ................ | B60C 1/0008 152/510 |
| 7,737,209 B2 * | 6/2010 | Miyazaki | ................ | B60C 1/00 524/508 |
| 7,776,951 B2 * | 8/2010 | Hirayama | ............. | B60C 1/0016 152/209.1 |
| 2005/0090616 A1 | 4/2005 | Dias et al. | | |
| 2007/0272338 A1 * | 11/2007 | Galimberti | ................ | B60C 1/00 152/458 |
| 2008/0015308 A1 * | 1/2008 | Kunisawa | ................ | C08K 3/36 524/588 |
| 2009/0038728 A1 * | 2/2009 | Kanenari | ................ | B32B 25/14 152/510 |
| 2009/0242094 A1 * | 10/2009 | Kato | .................... | B60C 1/0008 152/565 |
| 2010/0186866 A1 | 7/2010 | Tomoi | | |
| 2010/0193098 A1 * | 8/2010 | Kirino | ................ | C08L 15/00 152/450 |
| 2010/0319829 A1 * | 12/2010 | Hashimura | ........ | B29D 30/0681 152/510 |
| 2011/0024015 A1 | 2/2011 | Takahashi et al. | | |
| 2012/0070678 A1 | 3/2012 | Takahashi et al. | | |

FOREIGN PATENT DOCUMENTS

| | | | |
|---|---|---|---|
| EP | 2698408 A1 | | 2/2014 |
| EP | 2716473 A1 | | 4/2014 |
| JP | 1-314164 A | | 12/1989 |
| JP | 10-25375 A | | 1/1998 |
| JP | 11240108 A | | 9/1999 |
| JP | 2002-88209 A | | 3/2002 |
| JP | 2002-283808 A | | 10/2002 |
| JP | 2004-176048 A | | 6/2004 |
| JP | 2007-99146 A | | 4/2007 |
| JP | 2007-509778 T | | 4/2007 |
| JP | 2007-276631 A | | 10/2007 |
| JP | 2008-024215 A | | 2/2008 |
| JP | 2008-024219 A | | 2/2008 |
| JP | 2009-83537 | * | 4/2009 |
| JP | 2009-263653 A | | 11/2009 |
| JP | 2010-5986 A | | 1/2010 |
| JP | 2010-188955 A | | 9/2010 |
| JP | 2011-020672 A | | 2/2011 |
| WO | 2007/043497 A1 | | 4/2007 |
| WO | 2008/029939 A1 | | 3/2008 |
| WO | 2008/051253 A1 | | 5/2008 |
| WO | 2010/119685 A1 | | 10/2010 |

OTHER PUBLICATIONS

International Search Report for PCT/JP2012/064001 dated Jul. 24, 2012.
Office Action dated Dec. 2, 2014 in corresponding Japanese Patent Application No. 2011-122889.
Office Action dated Sep. 9, 2014 in corresponding Japanese Patent Application No. 2011-122889.
Office Action dated Sep. 9, 2014 in corresponding Japanese Patent Application No. 2011-122890.
Extended European Search Report dated Sep. 18, 2014 in European Patent Application No. 12794049.2.
Office Action dated Jun. 7, 2016 in corresponding Japanese Patent Application No. 2012-123707.

* cited by examiner

[Figure 1]
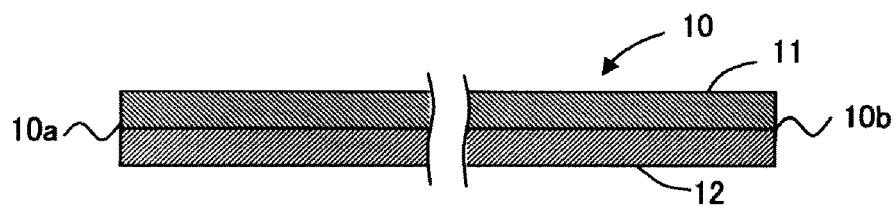
[Figure 2]
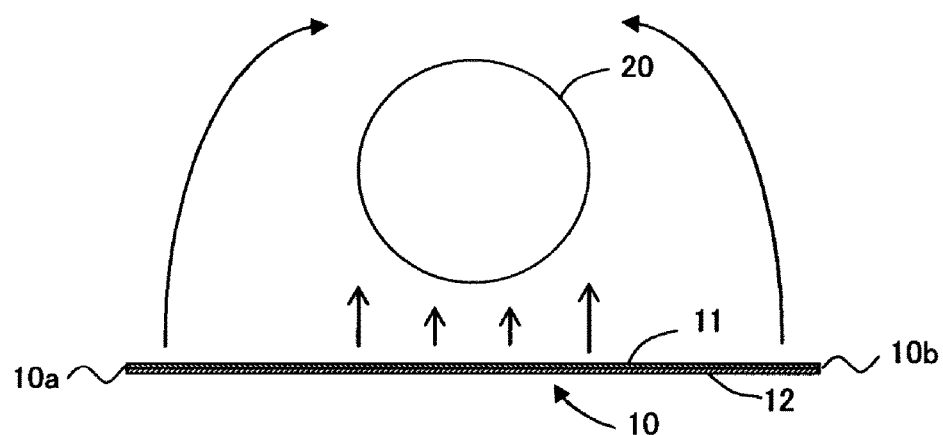
[Figure 3]
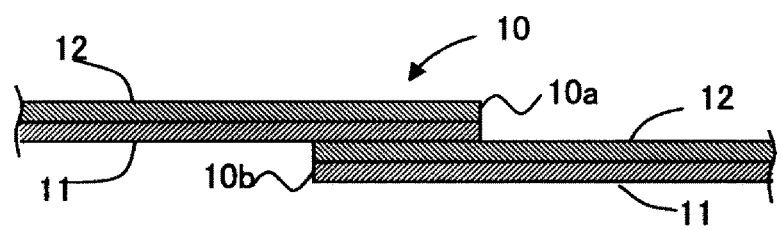

[Figure 4]
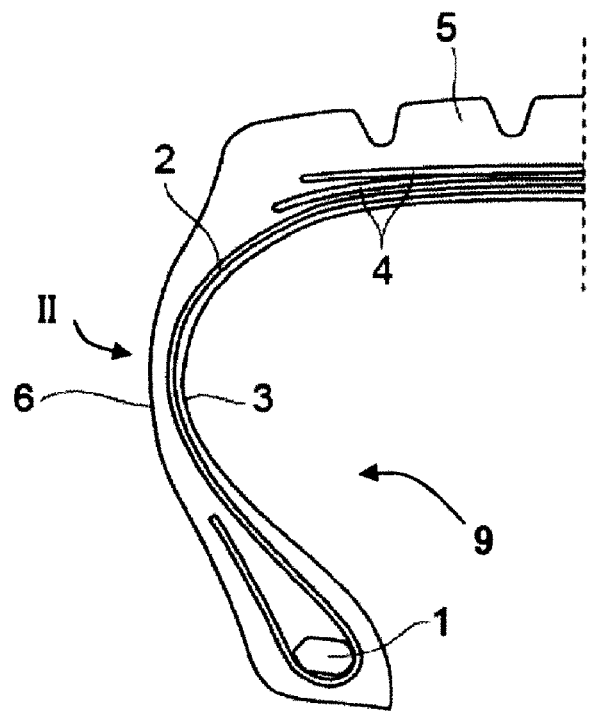
[Figure 5]
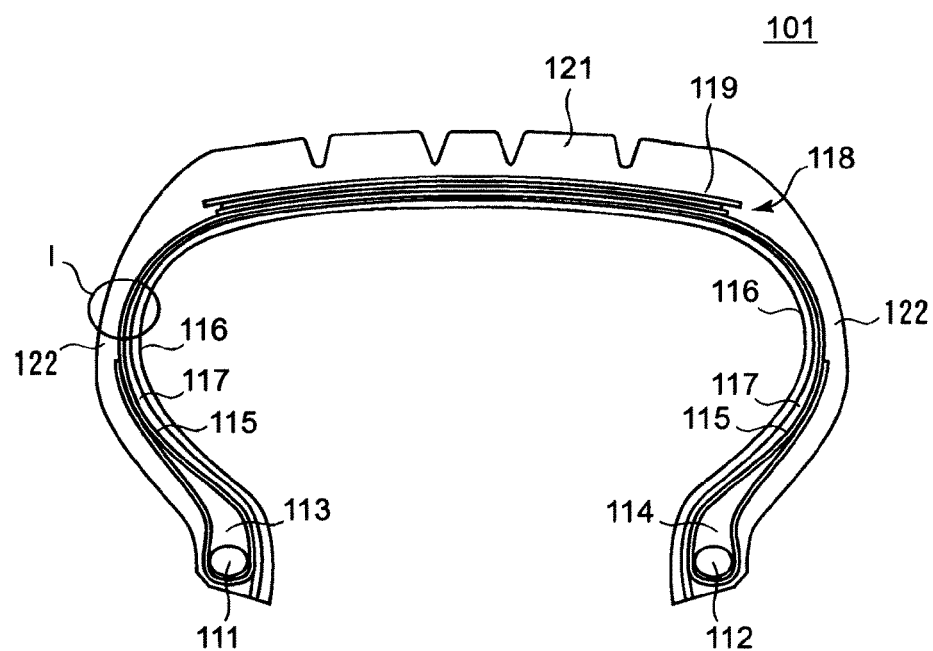

[Figure 6]
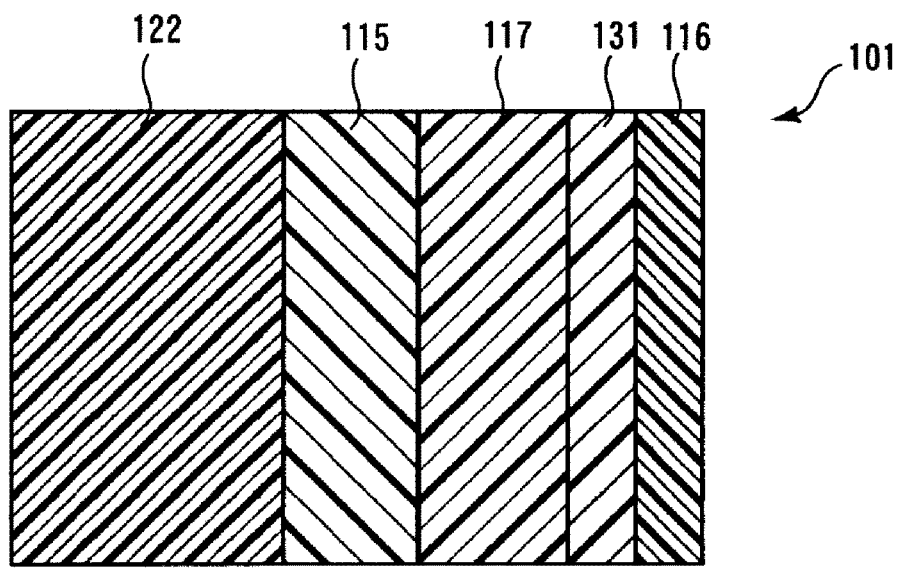
[Figure 7]
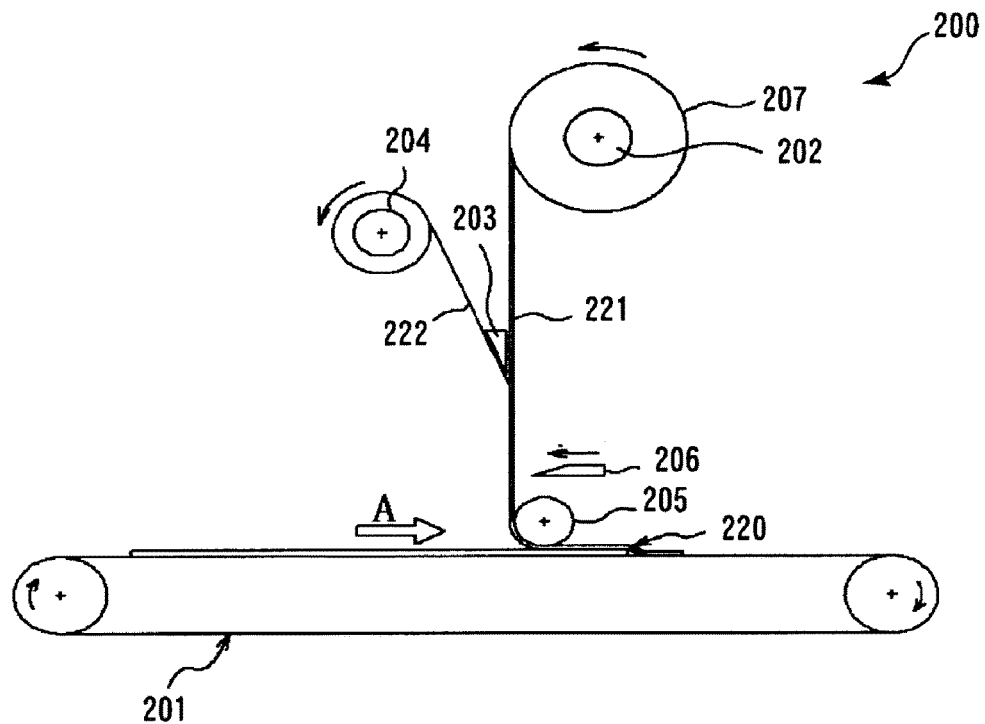

[Figure 8]
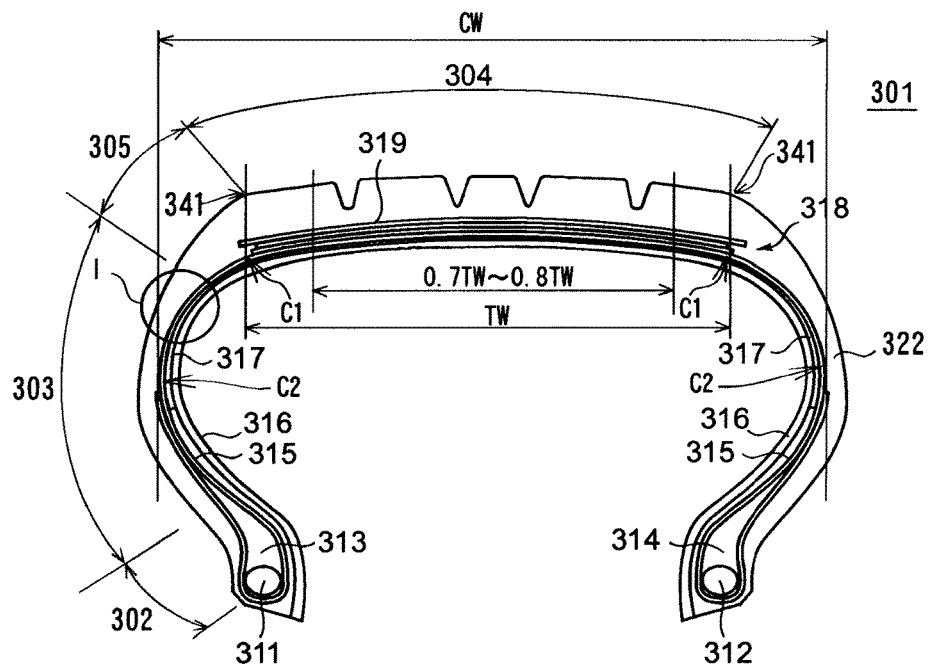
[Figure 9]
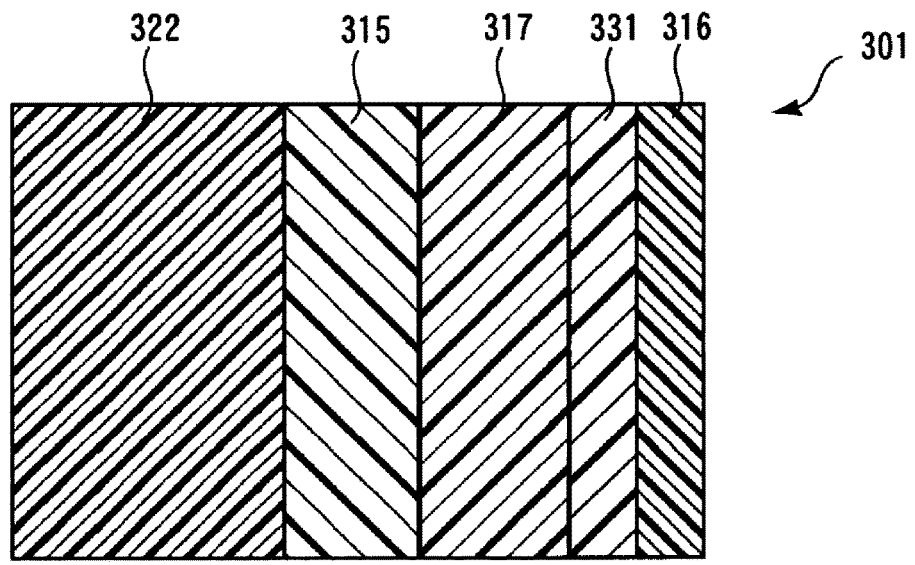

LAMINATE, TIRE, AND METHOD FOR PRODUCING TIRE

CROSS REFERENCE TO RELATED APPLICATIONS

This application is a National Stage of International Application No. PCT/JP2012/064001 filed May 30, 2012, claiming priority based on Japanese Patent Application Nos. 2011-122889 filed May 31, 2011, 2011-122890 filed May 31, 2011 and 2011-122893 filed May 31, 2011, the contents of all of which are incorporated herein by reference in their entirety.

TECHNICAL FIELD

The present invention relates to a laminate having a thermoplastic resin film-containing layer and a rubber layer, a tire formed by using the laminate having a thermoplastic resin film and a rubber layer as an inner liner, and a method of producing the tire.

BACKGROUND ART

As the inner liner layer of a pneumatic tire, a rubber layer containing a butyl rubber as the main component is generally used. In response to the recent requirement for saving the weight of a tire, the use of a thin resin film having low-gas permeability is proposed.

Conventionally, a method of producing a pneumatic tire formed by using this resin film as an inner liner includes sequentially wrapping and overlaying a resin film around a tire molding drum and then a member such as a carcass and a tread formed of an unvulcanized rubber around the resin film, removing the drum to obtain a green tire, and vulcanizing this green tire by heating to obtain a pneumatic tire (for example, Paragraph 0042 of Patent Document 1).

However, since there is no adhesion caused by covulcanization between the carcass formed of an unvulcanized rubber and the resin film, a problem arises in that the carcass and the resin film may be separated. A laminate formed by lining a resin film with a rubber layer may be previously prepared. However, when this laminate is wrapped around a tire molding drum, the resin film on the one side and the rubber layer on the other side are overlapped at the both ends of this laminate but may be separated.

To solve the problem of the separation of the resin film and the carcass, various technologies are proposed.

For example, Patent Document 2 proposes a technology using a resin film formed in a cylindrical shape without an adhesion part to form an inner liner layer.

Patent document 3 proposes a technology wrapping a laminate formed by lining the surface of a resin film with a rubber layer around a tire molding drum and overlapping and bonding the both ends of this laminate to an adhesive layer used for ends.

Patent document 4 proposes a laminate formed of a thermoplastic resin film, an adhesive layer on the surface of the thermoplastic resin film, and a rubber sheet displaced in the length direction against applied to this adhesive layer. The surface of the adhesive layer and the back surface of the rubber sheet are exposed at one end and the other end of this laminate, respectively. When this laminate is wrapped around a tire molding drum, the adhesive layer at one end of this laminate is bonded to the rubber sheet at the other end to prevent the overlapping part of the laminate from being separated.

The technologies of Patent Documents 1 to 4 have problems of the separation of the overlapping part of a laminate, the increase in stock management cost, the decrease in production efficiency, the increase in the number of components, the deterioration of wrapping workability around a molding drum, and the like.

Specifically, according to Patent Document 1, as stated, the overlapping part may be separated when a laminate is wrapped around a tire molding drum.

According to Patent Document 2, cylindrical thermoplastic resin films with various sizes depending on the sizes of tires are required to be prepared, arising problems of the increase in stock management cost, the decrease in production efficiency, and the like.

According to Patent Document 3, the number of components increases for the adhesive layer used for ends. Moreover, it needs additional work to transfer and laminate this adhesive layer used for ends.

According to Patent Document 4, since the layers of the laminate are displaced and laminated, the lamination requires additional work. Moreover, since the adhesive layer is exposed at one end in the length direction, the wrapping workability around a molding drum is poor.

The inner surface of the tire in which gas is to be filled has an inner liner disposed as a gas barrier layer blocking off gas. In recent years, a technology using a thermoplastic resin film with a small amount of oxygen permeation, i.e., a high gas barrier property, and a weight lighter than conventional butyl rubbers as an inner liner is proposed (for example, see Patent Document 5).

In Patent Document 5, setting the storage modulus of the layer of a diene rubber composition (carcass) smaller than that of the layer of a thermoplastic resin elastomer composition (thermoplastic resin film) in combination with setting the storage modulus of an adhesive bonding these layers to a value intermediate between those of the layers prevents the stress concentration caused by the deformation of a tire from occurring to the thermoplastic resin film and improves the low temperature durability of the thermoplastic resin film.

However, there is still a room for improvement in the tire disclosed in Patent Document 5. In a tire formed by using a thermoplastic resin film as an inner liner, the following property of the inner liner to the deformation of the tire decreases, for example, in a low-temperature environment of −20° C. or less compared with about 0° C. Therefore, in the adhesive interface between the inner liner and the carcass, the stress on the inner liner may further severely increase to cause the higher probability of fractures and cracks of the inner liner.

Accordingly, for example, in a low-temperature environment of −20° C. or less, the inner liner and the carcass are required to be further softened. However, too much softened carcass has a problem of the decreased durability of the entire tire. A tire capable of delivering sufficient performance can be provided if the probability of fractures and cracks of the inner liner can be maintained low without the durability of a tire being sacrificed even in the above-mentioned low-temperature environment.

RELATED ART DOCUMENTS

Patent Documents

Patent Document 1: JP 10-025375A
Patent Document 2: JP 2002-283808A
Patent Document 3: JP 2007-276631A
Patent Document 4: JP 2010-005986A
Patent Document 5: JP 2007-099146A

DISCLOSURE OF THE INVENTION

An objective of the present invention is to provide a laminate including a thermoplastic resin film and a rubber layer with no separation of the overlapping part of the laminate, a low stock management cost, a high production efficiency, no increase in the number of components, and excellent wrapping workability around a molding drum and to provide a method of producing a pneumatic tire formed by using this laminate.

Another objective of the present invention is to provide a tire formed by using a thermoplastic resin film as an inner liner, the tire being capable of improving the resistance to the fractures and the cracks of the inner liner in the low-temperature environment and to provide a method of producing this tire.

As the result of intensive studies by the present inventors to achieve the above objective, they found that the objective could be achieved by a laminate having a thermoplastic resin film and a rubber layer formed by using an epoxidized diene rubber.

Furthermore, the present inventors also found that in a tire formed by using a thermoplastic resin film as an inner liner, disposing the rubber layer with the dynamic storage modulus being set to a specific value between the carcass and the inner liner improves the resistance to the fractures and the cracks of the inner liner in the low-temperature environment. The present invention has been achieved based on these findings.

Specifically, the present invention includes the following contents.

[1] A laminate includes a thermoplastic resin film-containing layer and a rubber layer, in which the rubber layer contains a modified diene polymer.

[2] A tire includes the laminate according to [1] as an inner liner.

[3] A method of producing a pneumatic tire includes wrapping the laminate according to [1] around a tire molding drum so that the rubber layer is disposed on the outside; further wrapping a member for a tire around the laminate; removing the molding drum to obtain a green tire; and vulcanizing the green tire by heating to obtain a pneumatic tire.

[4] A method of producing a tire having a carcass, an inner liner formed of a thermoplastic resin film, a rubber layer disposed between the carcass and the inner liner, an adhesive layer bonding the inner liner to the rubber layer includes the steps of: applying the inner liner to the rubber layer with a dynamic storage modulus E' at −20° C. of $1.0 \times 10^5$ to $1.0 \times 10^7$ Pa and a thickness of 0.1 to 1 mm through the adhesive layer to form a laminate; and disposing the laminate on the carcass so that the rubber layer in the laminate is opposed to the carcass disposed on a tire molding drum.

The present invention can provide a laminate including a thermoplastic resin film and a rubber layer with no separation of the overlapping part of the laminate, a low stock management cost, a high production efficiency, no increase in the number of components, and excellent wrapping workability around a molding drum and to provide a method of producing a pneumatic tire formed by using this laminate.

The present invention can also provide a tire formed by using a thermoplastic resin film as an inner liner, the tire being capable of improving the resistance to the fractures and the cracks of the inner liner in the low-temperature environment and to provide a method of producing this tire.

BRIEF DESCRIPTION OF THE DRAWINGS

FIG. 1 shows across sectional pattern diagram illustrating an example of the laminate of the present invention.

FIG. 2 shows a pattern diagram illustrating the step of wrapping the laminate of FIG. 1 around a tire molding drum.

FIG. 3 shows a cross sectional pattern diagram of the overlapping part of the laminate of FIG. 2 wrapped around a tire molding drum.

FIG. 4 shows a partial sectional view of a pneumatic tire.

FIG. 5 shows a sectional view of the tire shown as an embodiment of the present invention in the tread width direction and the tire radial direction.

FIG. 6 shows an enlarged sectional view illustrating the region I of FIG. 5.

FIG. 7 shows a schematic diagram of a film application device used in the step S1 of producing a tire shown as an embodiment of the present invention.

FIG. 8 shows a sectional view of the tire shown as an embodiment of the present invention in the tread width direction and the tire radial direction.

FIG. 9 shows an enlarged sectional view illustrating the region I of FIG. 8.

THE MOST PREFERRED EMBODIMENT TO CARRY OUT THE INVENTION

1. First Embodiment

Laminate

The laminate of the present invention includes a thermoplastic resin film-containing layer and a rubber layer, in which the rubber layer contains a modified diene polymer.

The laminate of the present invention will be explained in detail below with reference to the attached drawings. FIG. 1 shows a cross sectional pattern diagram illustrating an example of the laminate of the present invention, FIG. 2 shows a pattern diagram illustrating the step of wrapping the laminate of FIG. 1 around a tire molding drum, and FIG. 3 shows a cross sectional pattern diagram of the overlapping part of the laminate of FIG. 2 wrapped around a tire molding drum.

The laminate 10 of FIG. 1 includes a thermoplastic resin film-containing layer 11 and a rubber layer 12, in which the rubber layer 12 contains a modified diene polymer. Reference numeral 10a shows the left end of this laminate 10. Reference numeral 10b shows the right end of this laminate 10. The laminate 10 has the ends 10a and 10b.

Since containing a modified diene polymer, this rubber layer 12 has excellent adhesion to the thermoplastic resin film-containing layer 11. Accordingly, an overlapping part formed by overlaying the ends 10a and 10b of this laminate 10 has excellent adhesion.

When a pneumatic tire formed by using this laminate 10 is produced, the laminate 10 is wrapped around a tire molding drum 20 so that the thermoplastic resin film-containing layer 11 is faced to the outer circumferential face of a tire molding drum 20 as shown in FIG. 2. The details are described later. As shown in FIG. 3, after this wrapping, the surface of the thermoplastic resin film-containing layer 11 adjacent to the end 10a of the laminate 10 and the surface of the rubber layer 12 adjacent to the end 10b form an overlapping part. As described above, since this rubber layer 12 containing a modified diene polymer has excellent adhesion to the thermoplastic resin film-containing layer 11, this overlapping part has also excellent adhesion.

The thermoplastic resin film-containing layer and the rubber layer will be explained in this order.

Thermoplastic Resin Film-Containing Layer

The thermoplastic resin film-containing layer has a laminated structure of a thermoplastic resin film (layer A) and the elastomer layer formed of a resin composition containing an elastomer (layer B).

The thermoplastic resin film-containing layer may be formed of a single layer of thermoplastic resin film (layer A), two or more layers of thermoplastic resin films (layer A), or two or more layers in combination of a thermoplastic resin film (layer A) and another layer. The another layer is preferably a layer formed of a resin composition containing an elastomer (layer B), which has a high extensibility. This can improve the extensibility of the entire thermoplastic resin film-containing layer even when the extensibility of the thermoplastic resin film (layer A) is low.

Layer Structure (Multi-Layered Laminate)

The layer structure (multi-layered laminate) when the thermoplastic resin film-containing layer is multi-layered, the thermoplastic resin film (layer A), the layer formed of a resin composition containing an elastomer (layer B), the relationship between the layers A and B, and the method of preparing the multi-layered laminate will be explained below in this order.

The multi-layered laminate is preferably provided with two or more layers in total: at least one thermoplastic resin film (layer A) and at least one layer formed of a resin composition containing an elastomer (layer B). Accordingly, the multi-layered laminate has the layer A with low-gas permeability and the layer B with a high extensibility to lead to low-gas permeability and excellent anti-crack property in the low-temperature environment of the entire thermoplastic resin film-containing layer.

From this viewpoint and the viewpoint of the preparation, the thermoplastic resin film-containing layer is preferably a multi-layer structure formed of 3 or more layers. The thermoplastic resin film-containing layer is preferably a multi-layer structure formed of 7 or more layers. The total number of the layers A and B is preferably 3 or more, more preferably 7 or more.

The total number of the layers A and B is further more preferably 17 or more, particularly preferably 25 or more, further particularly preferably 48 or more, and extremely preferably 65 or more. The multi-layered laminate may have even more layers. Thus, the total number of the layers A and B can be 128 or more, 256 or more, 512 or more, or 2024 or more. The upper limit of the total number of the layers is appropriately selected depending on the application of the multi-layered laminate.

This multi-layered laminate can have a layer C and the like other than the layers A and B. The order of laminating the layers A and B can be, for example, (1) A, B, A, B . . . A, B (i.e., $(AB)_n$)

(2) A, B, A, B . . . A (i.e., $(AB)_n A$)

(3) B, A, B, A . . . B (i.e., $(BA)_n B$)

(4) A, A, B, B . . . B, B (i.e., $(AABB)_n$), or the like. Moreover, when the multi-layered laminate has additional layers C, the order of laminating the layers can be (5) A, B, C . . . A, B, C (i.e., $(ABC)_n$) or the like. In the above-mentioned (1)-(5), n is an integer of 1 or more.

Particularly, the layers A and B are preferably laminated alternatively as the above-mentioned laminating order (1), (2), or (3). This laminate with the layers A and B being alternately laminated may be irradiated with active energy rays. This can improve the binding property between laminated layers to exhibit a high adhesion. As a result, the interlayer adhesion and thus the low-gas permeability, the bending resistance, and the like of the multi-layered laminate can be greatly improved. Moreover, in the structure with the layers A and B being alternatively laminated, a layer A is placed between layers B to further improve the extensibility of the layer A.

In this multi-layered laminate, the average thickness of the above-mentioned layers A and B is preferably 0.001 to 10 μm, more preferably 0.001 to 40 μm. The average thickness of the layers A and B falling within the above-mentioned range can increase the number of layers without changing the thickness of the entire multi-layered laminate. As a result, the low-gas permeability, the bending resistance, and the like of the multi-layered laminate can be further improved.

Since in the multi-layered laminate, a layer A with a thickness falling within the above-mentioned range and a layer B formed of a resin composition containing an elastomer are laminated, the extensibility of the layer A formed of a resin composition with a low extensibility can be further improved even when the extensibility of the gas barrier resin is low. This is because the layer A formed of a resin composition with low extensibility being thinly laminated on the layer B with excellent extensibility may allow the extensibility of the resin composition to transit from low to high. The present inventors pay attention to the above-mentioned fact. Although the layer A is generally formed of a material with a low extensibility, extremely reducing the thickness of each layer can highly exert low-gas permeability and the bending resistance required for the thermoplastic resin film-containing layer. Therefore, the multi-layered laminate can maintain the properties including the low-gas permeability even when deformed, for example, bended.

The lower limit of the average thickness of the layer A is 0.001 μm, preferably 0.005 μm, more preferably 0.01 μm. On the other hand, the upper limit of the average thickness of the layer A is 10 μm, preferably 7 μm, more preferably 5 μm, more preferably 3 μm, further more preferably 1 μm, further more preferably 0.5 μm, further more preferably 0.2 μm, particularly preferably 0.1 μm, most preferably 0.05 μm.

If the average thickness of the layer A is smaller than the above-mentioned lower limit, the layer A is hardly formed in a uniform thickness. This may decrease the low-gas permeability and the bending resistance of the multi-layered laminate. On the other hand, if the average thickness of the layer A is larger than the above-mentioned upper limit, the durability and the anti-crack property of the multi-layered laminate may decrease when the thickness of the entire multi-layered laminate is not changed. Moreover, if the average thickness of the layer A is larger than the above-mentioned upper limit, the extensibility of the layer A as described above may not be sufficiently improved. The average thickness of the layer A is referred to as a value determined by dividing the total thickness of all the layers A contained in the multi-layered laminate by the number of the layers A.

The lower limit of the average thickness of the layer B is 0.001 μm, preferably 0.005 μm, more preferably 0.01 μm for the same reason as that for the layer A. The upper limit of the average thickness of the layer B is 40 μm, preferably 30 μm or less, more preferably 20 μm or less. On the other hand, if the average thickness of the layer B is larger than the above-mentioned upper limit, the durability and the anti-crack property of the multi-layered laminate may decrease when the thickness of the entire multi-layered laminate is not changed. The average thickness of the layer B is referred to as a value determined by dividing the total thickness of all the layers B contained in the multi-layered laminate by the number of the layers B.

The ratio (layer B/layer A) of the average thickness of the layer B to that of a layer A is preferably ⅓ or more, more preferably ½ or more. Further more preferably, the above-mentioned ratio is 1 or more. In other words, the average thickness of the layer B is the same as or more than that of a layer A. The ratio is particularly preferably 2 or more. This ratio improves the bending fatigue resistance to fractures of all the layers of the multi-layered laminate.

The thickness of the multi-layered laminate is preferably 0.1 μm or more and 1,000 μm or less, more preferably 0.5 μm or more and 750 μm or less, further more preferably 1 μm or more and 500 μm or less. The thickness of the multi-layered laminate falling within the above-mentioned range in combination with the average thickness of the layers A and B falling within the above-mentioned can maintain the applicability to the inner liner and the like of a pneumatic tire and further improve the gas barrier property, the bending resistance, the anti-crack property, the durability, the extensibility, and the like. The thickness of the multi-layered laminate is determined by measuring the thickness of the cross section at an arbitrarily-selected point of the multi-layered laminate.

Thermoplastic Resin Film (Layer A)

The thermoplastic resin film (layer A) may at least contain a layer formed of a resin composition (A3) in which a flexible resin (A2) with a dynamic storage modulus E' at −20° C. lower than that of the thermoplastic resin (A1) is dispersed in a matrix formed of a thermoplastic resin (A1).

The "dynamic storage modulus E' at −20° C." is measured at −20° C. with a spectrometer available from Ueshima Seisakusho Co., Ltd. at an initial strain of 10%, a dynamic strain of 0.1%, and a frequency of 15 Hz.

The thermoplastic resin (A1) preferably has a dynamic storage modulus E' at −20° C. of more than $1 \times 10^8$ Pa, specifically including a polyamide resin, a polyvinylidene chloride resin, a polyester resin, a thermoplastic urethane elastomer, and an ethylene-vinyl alcohol copolymer resin. Among these, an ethylene-vinyl alcohol copolymer resin is preferable. The ethylene-vinyl alcohol copolymer resin has low air permeability and very excellent low-gas permeability. These thermoplastic resins (A1) may be used alone or in combination of two or more kinds.

On the other hand, the flexible resin (A2) is required to have a dynamic storage modulus E' at −20° C. lower than that of the above-mentioned thermoplastic resin (A1), which is preferably $1 \times 10^8$ Pa or less. The dynamic storage modulus E' of $1 \times 10^8$ Pa or less can decrease the modulus of the thermoplastic resin film (layer A) so as to improve the anti-crack property and the bending resistance in the low-temperature environment.

Moreover, the above-mentioned flexible resin (A2) preferably has a functional group reacting with a hydroxyl group. This uniformly disperses the flexible resin (A2) in a thermoplastic resin (A1). The functional group reacting with a hydroxyl group includes a maleic anhydride residue, a hydroxyl group, a carboxyl group, and an amino group. This flexible resin (A2) with a functional group reacting with a hydroxyl group specifically includes a maleic anhydride-modified hydrogenated styrene-ethylene-butadiene-styrene block copolymer and a maleic anhydride-modified ultralow-density polyethylene.

The above-mentioned flexible resin (A2) preferably has an average particle size of 2 μm or less. If the average particle size of the flexible resin (A2) more than 2 μm, the bending resistance of the thermoplastic resin film (layer A) may not be sufficiently improved. This may decrease the gas barrier property and thus deteriorate the internal pressure retention of a tire. The average particle size of the flexible resin (A2) in the thermoplastic resin film (layer A) is observed with a transmission electron microscope (TEM), for example, after the sample is frozen and cut out into a section.

The content of the flexible resin (A2) in the thermoplastic resin film (layer A) preferably falls within the range of 10 to 30% by mass. If the content of the flexible resin (A2) is less than 10% by mass, the effect on the improvement of the bending resistance may be small. On the other hand, if the content of the flexible resin (A2) is more than 30% by mass, the gas permeability may increase.

The above-mentioned ethylene-vinyl alcohol copolymer resin is preferably a modified ethylene-vinyl alcohol copolymer obtained, for example, by reacting an epoxy compound with an ethylene-vinyl alcohol copolymer. This modified ethylene-vinyl alcohol copolymer has a lower modulus than a typical ethylene-vinyl alcohol copolymer so as to have high fracture resistance when the layer is bent and excellent anti-crack property in the low-temperature environment.

The above-mentioned ethylene-vinyl alcohol copolymer contains ethylene in a content of preferably 25 to 50% by mole, more preferably 30 to 48% by mole, further more preferably 35 to 45% by mole. If the content of ethylene is less than 25% by mole, the bending resistance, the fatigue resistance, and the melt-molding property may deteriorate. On the other hand, if the content of ethylene is more than 50% by mole, the gas barrier property may not securely be provided. The ethylene-vinyl alcohol copolymer also has a saponification degree of preferably 90% or more, more preferably 95% or more, further more preferably 99% or more. If the saponification degree is less than 90%, the gas barrier property and the heat stability during molding may be insufficient. The ethylene-vinyl alcohol copolymer also has a melt flow rate (MFR) of preferably 0.1 to 30 g/10 minutes, more preferably 0.3 to 25 g/10 minutes at 190° C. under a load of 2160 g.

In the present invention, the method of preparing a modified ethylene-vinyl alcohol copolymer is not limited in particular, preferably including reacting an ethylene-vinyl alcohol copolymer with an epoxy compound in a solution. More specifically, a modified ethylene-vinyl alcohol copolymer can be prepared by adding and reacting an epoxy compound in an ethylene-vinyl alcohol copolymer solution in the presence of an acid catalyst or an alkali catalyst, preferably an acid catalyst. The solvent includes a polar aprotonic solvent such as dimethyl sulfoxide, dimethyl formamide, dimethyl acetamide, and N-methylpyrrolidone. The acid catalyst includes p-toluenesulfonic acid, methanesulfonic acid, trifluoromethanesulfonic acid, sulfuric acid, and boron trifluoride. The alkali catalyst includes sodium hydroxide, potassium hydroxide, lithium hydroxide, and sodium methoxide. The amount of the catalyst preferably falls within the range of about 0.0001 to 10 parts by mass based on 100 parts by mass of the ethylene-vinyl alcohol copolymer.

The epoxy compound to be reacted with the above-mentioned ethylene-vinyl alcohol copolymer is preferably a monovalent epoxy compound. A divalent or polyvalent epoxy compound is cross-linked to an ethylene-vinyl alcohol copolymer to generate gel and particles, which may deteriorate the crystalline quality of the thermoplastic resin film-containing layer. From the viewpoint of the easiness of preparation, the gas barrier property, the bending resistance, and the fatigue resistance of the modified ethylene-vinyl alcohol copolymer, glycidol and epoxypropane are particularly preferable among monovalent epoxy compounds. The above-mentioned epoxidized compound is reacted in a content of preferably 1 to 50 parts by mass, more preferably 2 to 40 parts by mass, further more preferably 5 to 35 parts by mass based on 100 parts by mass of the ethylene-vinyl alcohol copolymer.

The above-mentioned modified ethylene-vinyl alcohol copolymer has a melt flow rate (MFR) of preferably 0.1 to 30 g/10 minutes, more preferably 0.3 to 25 g/10 minutes, further more preferably 0.5 to 20 g/10 minutes at 190° C. under a load of 2160 g from the viewpoint of obtaining gas barrier property, bending resistance, and fatigue resistance.

The above-mentioned thermoplastic resin film (layer A) can be formed into a film, a sheet, or the like by extrusion such as a melt molding process, preferably a T-die process or an inflation process, preferably at a melting temperature of preferably 150 to 270° C., after the resin composition (A3) is prepared by mixing the thermoplastic resin (A1) with the flexible resin (A2). The above-mentioned thermoplastic resin film (layer A) may be single- or multi-layered as long as containing a layer formed of the resin composition (A3). The multi-layering method includes coextrusion.

The above-mentioned thermoplastic resin film (layer A) has an oxygen permeation coefficient at 20° C. and 65% RH of preferably $3.0 \times 10^{-12}$ cm$^3$/cm$^2$·sec·cmHg or less, more preferably $1.0 \times 10^{-12}$ cm$^3$/cm$^2$·sec·cmHg or less, further more preferably $5.0 \times 10^{-13}$ cm$^3$/cm$^2$·sec·cmHg or less. If the oxygen permeation coefficient at 20° C. and 65% RH is more than $3.0 \times 10^{-12}$ cm$^3$/cm$^2$·sec·cmHg, the thermoplastic resin film (layer A) has to be thickened to improve the internal pressure retention of a tire when this thermoplastic resin film (layer A) is used as an inner liner. This cannot sufficiently decrease the weight of a tire.

Furthermore, the above-mentioned thermoplastic resin film (layer A) is preferably cross-linked. If the thermoplastic resin film (layer A) is not cross-linked, the laminate is severely deformed and thus ununiformed during the tire vulcanization step. This may deteriorate the gas barrier property, the bending resistance, and the fatigue resistance of the thermoplastic resin film (layer A). The cross-linking method preferably includes irradiating energy rays. The energy rays include ionizing radiations such as ultraviolet rays, electron beams, X-rays, α-rays, and γ-rays. Among these, electron beams are particularly preferable. The irradiation of electron beams is preferably conducted after the thermoplastic resin film (layer A) is processed into a molded article such as a film or a sheet. The dose of electron beams preferably falls within the range of 10 to 60 Mrad, more preferably 20 to 50 Mrad. If the dose of electron beams is less than 10 Mrad, the cross-linking is hardly promoted. On the other hand, if the dose of electron beams is more than 60 Mrad, the molded article easily degrades. Moreover, the thermoplastic resin film (layer A) may be subjected to a surface treatment by the oxidation process, the roughening process, or the like to improve the tackiness to the adhesive layer. The oxidation process includes corona discharge treatment, plasma discharge treatment, chromic acid treatment (wet treatment), flame treatment, heated air treatment, ozone treatment, and ultraviolet ray radiation treatment. The roughening process includes sand blasting treatment and solvent treatment. Among these, corona discharge treatment is preferable.

Layer Formed of Resin Composition Containing Elastomer (Layer B)

The above-mentioned multi-layered laminate (thermoplastic resin film-containing layer) preferably contains one or more layers formed of a resin composition containing an elastomer (layer B) from the viewpoint of the water resistance and the adhesion to rubber. As the elastomer, a thermoplastic elastomer is preferably used for the melt molding process.

This thermoplastic elastomer can include at least one kind selected from a group consisting of, for example, a thermoplastic polystyrene elastomer, a thermoplastic polyolefin elastomer, a thermoplastic polydiene elastomer, a thermoplastic polyvinyl chloride elastomer, a thermoplastic chlorinated polyethylene elastomer, a thermoplastic polyurethane elastomer (hereinafter referred to as "TPU"), a thermoplastic polyester elastomer, a thermoplastic polyamide elastomer, and a thermoplastic fluorine resin elastomer. Among these, from the viewpoint of the easy molding, at least one kind selected from a group consisting of a thermoplastic polystyrene elastomer, a thermoplastic polyolefin elastomer, a thermoplastic polydiene elastomer, a thermoplastic polyurethane elastomer, a thermoplastic polyester elastomer, and a thermoplastic polyamide elastomer is preferably used, and a thermoplastic polyurethane elastomer is more preferably used.

The above-mentioned thermoplastic polyurethane elastomer is obtained by reacting a polyol, an isocyanate compound, and a short chain diol. The polyol and the short chain diol form linear polyurethane by the addition reaction with an isocyanate compound. The above-mentioned polyol forms the soft segment of the thermoplastic polyurethane elastomer, and the diisocyanate and the diol form the hard segment. The thermoplastic urethane elastomer can widely change its properties by changing the types, the mixing amounts, the polymerization conditions, and the like of the raw materials. This thermoplastic urethane elastomer preferably includes a polyether urethane.

Relationship Between Layers A and B

The peel strength between the layers A and B in the above-mentioned multi-layered laminate is measured at a tension rate of 50 mm/minute under 23° C. and 50% RH atmosphere in accordance with JIS-K6854 after the multi-layered laminate is heated at 180° C. for 15 minutes, which is preferably 25 N/25 mm or more, more preferably 27 N/25 mm or more, further more preferably 30 N/25 mm or more, particularly 50 N/25 mm or more. Accordingly, the layers A and B have very excellent interlayer adhesion.

Regarding the interlayer relationship of the multi-layered laminate, crosslinking reaction between molecules occurs at the interface of the layers A and B by irradiating active energy rays. Thus, molecules at the interface may be strongly bonded to provide a high interlayer adhesion.

Method of Preparing Multi-layered Laminate

The method of preparing the multi-layered laminate is not limited in particular as long as the layers A and B are well laminated and bonded. As the method, a well-known method such as coextrusion, adhesion, attachment, coating, bonding, and deposition can be used. The method of preparing the multi-layered laminate includes, specifically, (1) using a resin composition for forming the layer A and a resin composition for forming the layer B to prepare a multi-layered laminate having the layers A and B by multi-layer coextrusion or (2) using a resin composition for forming the layer A and a resin composition for forming the layer B, overlaying a plurality of layers through an adhesive, and drawing the overlaid layers to prepare a multi-layered laminate having the layers A and B. Among these, from the viewpoint of the high productivity, the excellent interlayer adhesion, the method preferably includes (1) using a resin composition for forming the layer A and a resin composition for forming the layer B to prepare a multi-layered laminate having the layers A and B by multi-layer coextrusion.

In the multi-layer coextrusion, a resin composition for forming the layer A and a resin composition for forming the layer B are melted on heating, supplied from their respective extruder devices or pumps to an extrusion die through their respective flow paths, extruded from the extrusion die into layers. Then, the layers are laminated and bonded to form the multi-layered laminate. As this extrusion die, for example, a multi-manifold die, a field block, a static mixer, and the like can be used.

The multi-layered structure thus obtained is preferably irradiated with active energy rays as described above to promote crosslinking reaction so as to improve the interlayer adhesion between the layers A and B. The multi-layered laminate formed by irradiating active energy rays can improve the gas barrier property and the bending resistance as a result of the increased interlayer adhesion.

The above-mentioned active energy rays have energy quantum in electromagnetic radiation or charged particle radiation, which are specifically ultraviolet rays, γ rays, and electron beams. Among these active energy rays, electron beams are preferable from the viewpoint of the effect on the improvement of the interlayer adhesion. The use of electron beams as the active energy rays further promotes the crosslinking reaction between the layers so that the interlayer adhesion of the multi-layered laminate can be further improved.

When electron beams are irradiated various electron beam accelerators such as a Cockcroft-Walton accelerator, a Van de Graft accelerator, a resonance transformer accelerator, an insulated core transformer accelerator, a linear accelerator, a dynamitron accelerator, a radio-frequency accelerator are used as the electron beam source. The electron beams should typically be irradiated at an acceleration volt of 100 to 500 kV and an irradiation dose of 5 to 600 kGy.

When ultraviolet rays are used as active energy rays, ultraviolet rays with a wavelength 190 to 380 nm should be irradiated. As the ultraviolet ray source, for example, a high-pressure mercury lamp, a low-pressure mercury lamp, a metal halide lamp, a carbon-arc lamp, and the like are used without any limitations.

This multi-layered laminate has excellent interlayer adhesion, high gas barrier property, high extensibility, high thermoformability, and high durability as described above.

This multi-layered laminate is not limited to the above-mentioned embodiment. For example, it may include layers other than the layers A and B. The types of the resin compositions forming these other layers are not limited in particular but preferably have high adhesion between the layers A and/or B. The other layers particularly preferably have a molecular chain with a functional group forming a bond by reacting with, for example, the hydroxyl group of an EVOH in the layer A or the carbamate group or the isocyanate group of the molecular chain of TPU in the layer B.

Rubber Layer

The material of this rubber layer contains a modified diene polymer. The modified diene polymer is herein referred to as a diene polymer modified with a polar functional group.

The above-mentioned polar functional group is a functional group containing an oxygen atom, a nitrogen atom, a sulfur atom, a silicon atom, and a tin atom, specifically preferably an epoxy group, an amino group, an imino group, a nitrile group, an ammonium group, an isocyanate group, an imide group, an amide group, a hydrazo group, an azo group, a diazo group, a hydroxyl group, a carboxyl group, a carbonyl group, an oxycarbonyl group, a sulfide group, a disulphide group, a sulphonyl group, a sulfinyl group, a thiocarbonyl group, a nitrogenated heterocycle group, an oxygenated heterocyclic group, an alkoxysilyl group, and a tin-containing group. Particularly, an epoxy group and an isocyanate group are preferable.

The material of this rubber layer preferably contains a softener described later. By adjusting the content of this softener in the rubber layer, the dynamic storage modulus $E_2'$ at $-20°$ C. of this rubber layer 7 can also be adjusted.

The dynamic storage modulus $E_2'$ at $-20°$ C. of this rubber layer is preferably $1.0 \times 10^5$ to $1.0 \times 10^8$ Pa, more preferably $1.0 \times 10^5$ to $1.0 \times 10^7$ Pa, further more preferably $1.0 \times 10^5$ to $5.0 \times 10^5$ Pa. Preferably, the dynamic storage modulus $E_2'$ of $1.0 \times 10^5$ Pa or more can sufficiently secure the workability of rubber mixing and decrease the thickness of the rubber layer to fall within the range of 0.1 to 1 mm. The dynamic storage modulus $E_2'$ of $1.0 \times 10^8$ or less can improve the elasticity of the rubber layer in the low-temperature environment and reduce the deformation of the carcass, leading to the suppressed deformation of the thermoplastic resin film and the improved anti-crack property in the low-temperature environment.

In the present invention, the dynamic storage modulus $E_2'$ at $-20°$ C. is referred to as a value determined after vulcanized by heating, i.e., after a pneumatic tire is produced by using the laminate.

Modified Diene Polymer

The modified diene polymer includes modified natural rubbers (modified NRs) and/or modified synthetic rubbers. The modified synthetic rubbers include a modified polyisoprene rubber (modified IR), a modified polybutadiene rubber (modified BR), a modified styrene-butadiene copolymer (modified SBR), and a modified styrene isoprene copolymer (modified SIR). These modified natural rubbers and modified synthetic rubbers have excellent durability in the low-temperature environment.

The adhesive layer preferably contains two or more kinds of the above-mentioned modified diene polymers with different modification rates. Thus, the modified diene polymer with a low modification rate can improve the adhesion to the carcass, and the modified diene polymer with a high modification rate can improve the adhesion to the thermoplastic resin film.

In the present invention, the term "modification rate" means the rate (% by mole) of the number of modified double bonds to that of all the double bonds of a diene polymer before the modification.

The glass transition temperature (Tg) of this modified diene polymer is preferably 0° C. or less, more preferably $-20°$ C. or less, particularly $-50°$ C. or less. The glass transition temperature (Tg) of 0° C. or less can sufficiently decrease the brittle temperature so as to sufficiently secure the low-temperature endurance.

This glass transition temperature (Tg) is measured in the following way. The modified diene polymer is measured while the temperature is increased at 15° C./minute after cooled to $-150°$ C. with a differential scanning calorimeter (DSC) "RDC220" available from SEIKO. The tangents to the baseline are drawn before and after a peak in the DSC curve. The temperature of the middle point between two tangents is read and defined as Tg.

As the modified diene polymer, epoxy modified diene polymers are preferably used. Among the epoxy modified diene polymers, one kind or two or more kinds selected from an epoxidized natural rubber, an epoxidized butadiene rubber, and an epoxidized polyisoprene rubber are preferably used.

Epoxidized Natural Rubber (ENR)

As the modified diene polymer, an epoxidized natural rubber (hereinafter sometimes abbreviated to as "ENR") is more preferably used. As the epoxidized natural rubber (ENR), a commercially available epoxidized natural rubber may be used, or a natural rubber may be epoxidized and then used. The method of epoxidizing a natural rubber is not limited in particular, including a chlorohydrin method, a direct oxidation method, a hydrogen peroxide method, an alkylhydroperoxide method, and a peracid method. The peracid method includes, for example, reacting organic peracids such as peracetic acid and performic acid with a natural rubber. Through this reaction, double bonds in a natural rubber molecule are epoxidized. The structure of the epoxidized double bonds is clarified by proton nuclear magnetic resonance spectrum (NMR) and infrared absorption spectrum (IR). The content of the epoxy group is also measured by NMR.

This epoxidized natural rubber is likely to have low air permeability and significantly decrease the air permeability rate, compared with a natural rubber.

This epoxidized natural rubber (ENR) preferably contains at least two kinds of ENRs with different epoxidation rates. Thus, when the resin film layer is bonded to the rubber-like elastomer layer, an ENR with a low epoxidation degree and an ENR with a high epoxidation degree can improve the adhesion to the rubber-like elastomer layer and the adhesion to the resin film layer, respectively.

The term "epoxidation rate: A % by mol" herein means that A % of the double bonds in a natural rubber are epoxidized.

In the present invention, the epoxidation rate means the rate (% by mole) of the number of epoxidized double bonds to that of all the double bonds in a rubber before epoxidation and can be measured in the following way, for example. An ENR is dissolved in deuterated chloroform. The rate h(ppm) of integrated value of the carbon-carbon double bond moiety to that of the aliphatic moiety is determined by nuclear magnetic resonance (NMR (JNM-ECA series available from JEOL Ltd.)) spectrochemical analysis. Then, the epoxidation rate can be calculated by using the following expression.

$$\text{Epoxidation rate} = 3 \times h(2.69)/(3 \times h(2.69) + 3 \times h(5.14) + h(0.87)) \times 100$$

The ENRs with different epoxidation rates are preferably a combination of least two kinds of ENRs: (a) an ENR with an epoxidation rate of 5 to 30% by mole and (b) an ENR with an epoxidation rate of 40 to 90% by mole. The content of the above-mentioned combination of ENRs in the rubber layer is preferably 80 to 100% by mass. The content of ENRs falling within the range of 80 to 100% by mass improves the compatibility of the components in the rubber layer to improve the adhesivity and the durability of the rubber layer. From such viewpoints, the content of the above-mentioned combination of ENRs is more preferably 90 to 100% by mass, most preferably 100% by mass.

The use of an ENR with an epoxidation rate of 5 to 30% by mole as the ENR with a low epoxidation rate can maintain the properties of the natural rubber, suppress the increase in the dynamic storage modulus $E_2'$ at $-20°$ C. of the rubber layer, and prevent cracks from being caused in the low-temperature environment. The use of an ENR with an epoxidation rate of 40 to 90% by mole as the ENR with a high epoxidation rate can take advantage of the properties of ENR, act with functional groups in the thermoplastic resin film, and improve the gas barrier property of the obtained laminate.

In the present invention, the content ratio of the ENR with a low epoxidation rate and the ENR with a high epoxidation rate preferably falls within the range of 20:80 to 80:20 in mass ratio from the viewpoint of the balance of the above-mentioned respective effects.

Epoxidized Butadiene Rubber (EBR)

As the above-mentioned modified diene polymer, an epoxidized butadiene rubber (hereinafter sometimes abbreviated to as "EBR") is more preferably used.

The epoxidized butadiene rubber (EBR) is not limited in particular. As the EBR, a commercially available epoxidized butadiene rubber may be used, or a butadiene rubber (BR) may be epoxidized and then used. The method of epoxidizing a butadiene rubber is not limited in particular, including a chlorohydrin method, a direct oxidation method, a hydrogen peroxide method, an alkylhydroperoxide method, and a peracid method. The peracid method includes, for example, reacting organic peracids such as peracetic acid and performic acid with a butadiene rubber. Through this reaction, double bonds in a butadiene rubber molecule are epoxidized. The structure of the epoxidized double bonds is clarified by proton nuclear magnetic resonance spectrum (NMR) and infrared absorption spectrum (IR). The content of the epoxy group is also measured by NMR. By adjusting the amount of the organic peracid and the reaction time, the epoxidized butadiene rubber with various epoxidation rates can be prepared.

This epoxidized butadiene rubber is likely to have low air permeability and significantly decrease the air permeability rate, compared with a butadiene rubber.

The epoxidation rate of the epoxidized butadiene rubber (EBR) is preferably 5% by mole or more, more preferably 10% by mole or more. If the epoxidation rate is less than 5% by mole, the EBR is unlikely to have a tendency to obtain sufficient adhesivity to the thermoplastic resin film. The epoxidation rate is preferably 90% by mole or less, more preferably 75% by mole or less, further more preferably 60% by mole or less. If the epoxidation rate is more than 90% by mole, the modulus of elasticity at $-20°$ C. is likely to increase to cause the low-temperature crack property to decrease.

The epoxidized butadiene rubber (EBR) is not limited in particular. For example, as the EBR, BRs with a high cis content such as BR1220 available from ZEON CORPORATION and BR130B and BR150B available from UBE INDUSTRIES LTD., and BRs containing a syndiotactic polybutadiene crystal such as VCR412 and VCR617 available from UBE INDUSTRIES LTD., and the like can be used.

This epoxidized butadiene rubber (EBR) preferably contains at least two kinds of EBRs with different epoxidation rates. Thus, when the laminate is bonded to the rubber-like elastomer layer used for a carcass during the production of a tire, an EBR with a low epoxidation degree and an EBR with a high epoxidation degree can improve the adhesion to the rubber-like elastomer layer and the adhesion to the layer containing resin film, respectively.

The EBRs with different epoxidation rates are preferably a combination of least two kinds of EBRs: (a) an EBR with an epoxidation rate of 5 to 30% by mole and (b) an EBR with an epoxidation rate of 40 to 90% by mole. The content of the above-mentioned combination of EBRs in the rubber layer is preferably 80 to 100% by mass. The content falling of EBRs within the range of 80 to 100% by mass improves the compatibility of the components in the rubber layer to improve the adhesivity and durability of the rubber layer. From such viewpoints, the content of the above-mentioned combination of EBRs is more preferably 90 to 100% by mass, most preferably 100% by mass.

The use of an EBR with an epoxidation rate of 5 to 30% by mole as the EBR with a low epoxidation rate can maintain the properties of the butadiene rubber, suppress the increase in the dynamic storage modulus $E_2'$ at −20° C. of the rubber layer, and prevent cracks from being caused in the low-temperature environment. The use of an EBR with an epoxidation rate of 40 to 90% by mole as the EBR with a high epoxidation rate can take advantage of the properties of EBR, act with functional groups in the thermoplastic resin film, and improve the gas barrier property of the obtained laminate.

In the present invention, the content ratio of the EBR with a low epoxidation rate and the EBR with a high epoxidation rate preferably falls within the range of 20:80 to 80:20 in mass ratio from the viewpoint of the balance of the above-mentioned respective effects.

High Diene Elastomer

The modified diene polymer can contain a high diene elastomer in a content of preferably 20% by mass or less, more preferably 10% by mass or less but most preferably contains no high diene elastomers in addition to the above-mentioned ENR.

The high diene elastomer includes, for example, a natural rubber, a synthetic isoprene synthetic rubber (IR), a cis-1,4-polybutadiene rubber (BR), a syndiotactic 1,2-polybutadiene rubber (1,2BR), a styrene-butadiene rubber (SBR), an acrylonitrile-butadiene rubber (NBR), and a chloroprene rubber (CR).

These high diene rubbers may be used alone or in combination of two or more kinds. Among these, a natural rubber, a synthetic isoprene synthetic rubber (IR), and a cis-1,4-polybutadiene rubber (BR) are preferable.

Softener

To adjust the dynamic storage modulus $E_2'$ at −20° C. of the rubber layer, a softener is preferably contained. When the modification rate of a diene polymer is increased in order to improve the adhesion of the adhesive layer, the dynamic storage modulus $F_2'$ is likely to increase. However, the dynamic storage modulus $E_2'$ can be decreased to a desired value by adding a softener.

As the softener, any of a mineral oil softener, a vegetable oil softener, and a synthetic softener can be used. The mineral oil softener includes a petroleum softener and a coal tar softener. The petroleum softener includes processing oil, extender oil, asphalt, paraffin, liquid paraffin, vaseline, and petroleum resin. The coal tar softener includes coal tar and coumarone-indene resin.

The vegetable oil softener includes fatty oil softeners such as soybean oil, palm oil, pine oil, castor oil, flaxseed oil, rapeseed oil, coconut oil, and tall oil; waxes such as factice, bees wax, carnauba wax, and lanolin; and aliphatic acids such as linolic acid, palmitic acid, stearic acid, and lauric acid.

The synthetic softener includes synthetic resin softener, liquid rubber or oligomer, low-molecular plasticizer, polymer plasticizer, and reactive plasticizer.

The synthetic resin softener includes, for example, phenol aldehyde resin, styrene resin, and atactic polypropylene. The liquid rubber or oligomer includes, for example, polybutene, liquid butadiene rubber, liquid isoprene rubber, and liquid acrylonitrile butadiene rubber. The low-molecular plasticizer includes, for example, dibutyl phthalate, dioctyl phthalate, and tricresyl phosphate.

The content of this softener is preferably 1 to 30 parts by mass, more preferably 5 to 25 parts by mass, further more preferably 10 to 20 parts by mass based on 100 parts by mass of all the rubber components forming the rubber layer. The content of 1 part by mass or more can sufficiently increase the modification rate of the modified diene polymer. The content of 30 parts by mass or less prevents the rubber layer from softening too much. The softeners can be used alone selected from the above-mentioned ones or in combination of one or more kinds.

Vulcanizer and Vulcanization Accelerator

The rubber layer can contain a vulcanizer or contain the combination of a vulcanizer and a vulcanization accelerator to provide vulcanizability.

The vulcanizer includes sulfur, and the used amount of the vulcanizer is preferably 0.1 to 10 parts by mass, and more preferably 1.0 to 5 parts by mass in terms of sulfur content based on 100 parts by mass of the all the rubber components.

The vulcanization accelerator that can be used in the present invention is not particularly limited, including thiazole vulcanization accelerators such as M (2-mercaptobenzothiazole), DM (dibenzothiazolyl disulfide), and CZ (N-cyclohexyl-2-benzothiazolyl sulfenamide); and a guanidine vulcanization accelerators such as DPG (diphenylguanidine). The used amount of the vulcanization accelerator is preferably 0.1 to 5 parts by mass, and more preferably 0.2 to 3 parts by mass based on 100 parts by mass of the rubber components.

Optional Components

The rubber layer can optionally contain filler, tackifier resin, stearic acid, zinc oxide, antioxidant, and the like in addition to the above-mentioned components.

Filler

As the filler, inorganic filler and/or carbon black are used. The inorganic filler is not limited in particular, preferably including wet silica, aluminum hydroxide, aluminum oxide, magnesium oxide, montmorillonite, mica, smectite, organic montmorillonite, organic mica, and organic smectite. These inorganic fillers may be used alone or in combination of two or more.

On the other hand, the carbon black can be optionally selected from ones conventionally used as filler for reinforcing rubbers and the like, including FEF, SRF, HAF, ISAF, SAF, and GPF.

This filler preferably contain an inorganic filler together with a carbon black in a content of 5 parts by mass based on 100 parts by mass of the modified diene polymer from the viewpoint of the tackiness, the peel strength, and the like.

Tackifier Resin

The tackifier resin having the capability of providing tackiness to the rubber layer includes, for example, a phenol resin, a terpene resin, a modified terpene resin, a hydrogenated terpene resin, a rosin resin, a C5- and a C9-petroleum resin, a xylene resin, a coumarone-indene resin, a dicyclopentadiene resin, and a styrene resin. Among these, a phenol resin, a terpene resin, a modified terpene resin, a hydrogenated terpene resin, and a rosin resin are preferable.

The phenol resin can include resins obtained by condensing of p-t-butylphenol and acetylene in the presence of a catalyst and resins obtained by condensing an alkylphenol and formaldehyde. The terpene resin, the modified terpene resin, and the hydrogenated terpene resin can include terpene resins such as β-pinene resins and α-pinene resin, hydrogenated terpene resin obtained by hydrogenizing these resins, and modified terpene resins obtained by reacting terpene with phenol in the presence of a Friedel-Crafts catalyst or by condensing terpene and formaldehyde. The rosin resin can include a natural resin rosin and a rosin derivatives obtained by modifying the natural rosin through a hydrogenation, disproportionation, dimerization, esterification, or liming.

These resins may be used alone or in combination of two or more kinds. Among these, phenol resins are preferable.

The tackifier resin is used in an amount of 5 parts by mass or more, more preferably 5 to 40 parts by mass, further more preferably 5 to 30 parts by mass based on 100 parts by mass of the modified diene polymer.

The rubber layer can be prepared by mixing the above-mentioned components with, for example, a Banbury mixer, a roll, or the like.

The adhesive layer of the present invention thus obtained is used to bond the thermoplastic resin film to the carcass.

Thickness of Rubber Layer

The thickness of the above-mentioned rubber layer is 0.1 to 30 mm, preferably 0.1 to 2 mm, more preferably 0.1 to 1 mm, further more preferably 0.1 to 0.4 mm. The thickness of 0.1 mm or more can firmly bond the thermoplastic resin film to the carcass to successfully fulfill the function to improve the anti-crack property in the low-temperature environment. The thickness of 30 mm or less can achieve the weight saving of a pneumatic tire.

Method of Preparing Laminate

The method of preparing a laminate is not limited in particular, preferably including a process of using a rubber layer sheet or a process of using a coating liquid of the rubber layer composition as described below.

Process of Using Rubber Layer Sheet

In this process, the thermoplastic resin film-containing layer is previously prepared. The rubber layer sheet is also previously prepared with an extruder or the like. Subsequently, the rubber layer sheet is applied to the surface of this thermoplastic resin film-containing layer. The rubber layer sheet has tackiness because of containing the modified diene polymer to firmly bond to the thermoplastic resin film-containing layer.

Process of Using Coating Liquid of Rubber Layer Composition

In this process, the thermoplastic resin film-containing layer is previously prepared. An adhesive coating liquid formed by dissolving the rubber layer composition in a good solvent is applied to the surface of the thermoplastic resin film-containing layer.

As the good solvent, an organic solvent having a Hildebrand solubility parameter $\delta$ of 14 to 20 $MPa^{1/2}$ is used, which is a good solvent for rubber components. The organic solvent can include toluene, xylene, n-hexane, cyclohexane, chloroform, and methyl ethyl ketone. These organic solvents may be used alone or in combination of two or more kinds.

The concentration of the solid components in the coating liquid thus prepared is appropriately selected with consideration on the coating property and the handleability, generally falling within the range of 5 to 50% by mass and preferably 10 to 30% by mass.

Method of Producing Pneumatic Tire

The method of producing a pneumatic tire according to the present invention includes wrapping the laminate around a tire molding drum so that the rubber layer is disposed on the outside; further wrapping a member for a tire around the laminate; removing the molding drum to obtain a green tire; and vulcanizing the green tire by heating to obtain a pneumatic tire.

For the purpose of illustration, the structure of a pneumatic tire and then the details of the method of producing a pneumatic tire will be explained.

Structure of Pneumatic Tire

FIG. 4 shows a partial sectional view of an example of a pneumatic tire 9 in the tread width direction and the radial direction.

This pneumatic tire 9 includes a bead core 1, a carcass 2 wound around the bead core 1, an inner liner layer 3 disposed on the inside of the carcass 2 in the tire radial direction, a belt part having two belt layers 4 disposed on the outside of the crown part of the carcass 2 in the tire radial direction, a tread part 5 disposed on the outside of the belt part in the tire radial direction, and a side wall part 6.

This inner liner 3 consists of the above-mentioned laminate 10.

Method of Producing Pneumatic Tire

The method of producing the above-mentioned pneumatic tire 9 will be explained.

As described above (see FIGS. 1 to 3), the laminate 10 (inner liner 3) is wrapped around the outer circumferential face of a tire molding drum 20 so that the thermoplastic resin film-containing layer 11 is faced to the outer circumferential face of the tire molding drum 20. As shown in FIG. 3, after this wrapping, the surface of the thermoplastic resin film-containing layer 11 at the end 10a of the laminate 10 (inner liner 3) and the surface of the rubber layer 12 at the end 10b form an overlapping part.

A rubber member forming a carcass 2 is wrapped around this laminate 10 (inner liner 3). Around this rubber member, a rubber member forming the belt layer 4, a rubber member forming the tread part 5, and a rubber member forming the side wall part 6 are wrapped and overlaid. Then, the drum was removed to obtain a green tire. This green tire was vulcanized by heating at a temperature of 120° C. or more, preferably 125 to 200° C., more preferably 130 to 180° C. to obtain the pneumatic tire 9.

According to this method of producing a pneumatic tire, since containing a modified diene polymer, this rubber layer has excellent adhesion to the thermoplastic resin film-containing layer to lead to excellent adhesion of an overlapping part formed by overlaying the ends of the laminate formed by the above-mentioned wrapping, as described above. This securely prevents this overlapping part from being separated. Additionally, in contrast to Patent Document 2, since the overlapping part has excellent adhesion, the laminate is not required to be formed in a cylindrical shape without an overlapping part, which prevents the increase in stock management cost, the decrease in production efficiency, and the like. In contrast to Patent Document 3, since the adhesive layer used for ends to bonding the overlapping part is not necessary, the number of the components is decreased. This removes the time for the transfer and the lamination of this adhesive layer to obtain excellent workability. In contrast to Patent Document 4, since the each layer of the laminate is not displaced, the lamination does not require additional work and has excellent wrapping workability around a molding drum.

Carcass 2

The above-mentioned carcass 2 consists of one or two more carcass plies. The carcass ply has a structure with fiber such as polyester being covered with coating rubber.

The material of this coating rubber is not limited in particular. For example, diene rubber is used as the material. This diene rubber includes a natural rubber (NR), an isoprene synthetic rubber (IR), a cis-1,4-polybutadiene rubber (BR), a syndiotactic 1,2-polybutadiene rubber (1,2BR), and a styrene-butadiene rubber (SBR). These diene rubbers may be used alone or in combination of two or more kinds.

In the coating rubber, compounding ingredients typically used in rubber field, such as reinforcing filler, softener, antioxidant, vulcanizer, vulcanization accelerator for rubber, antiscorching agent, zinc oxide, and stearic acid can appropriately be mixed in accordance with the intended use, in addition to the above-mentioned rubber components. As these compounding ingredients, commercially available products can preferably be used.

2. Second Embodiment

The present invention will be explained. The present invention is a tire having a carcass, an inner liner formed of a thermoplastic resin film, a rubber layer disposed between the carcass and the inner liner, an adhesive layer bonding the inner liner to the rubber layer, in which the rubber layer has a dynamic storage modulus E' at −20° C. of $1.0 \times 10^5$ to $1.0 \times 10^7$ Pa and a thickness of 0.1 to 1 mm.

Tire

Structure of Tire

The structure of the tire according to an embodiment of the present invention will be explained in detail below. FIG. 5 shows a sectional view of the tire shown as an embodiment of the present invention in the tread width direction and the tire radial direction. FIG. 6 shows an enlarged sectional view illustrating the region I of FIG. 5.

In the description of the following drawings, the same or similar reference numerals are assigned to the same or similar parts. However, it should be noted that the drawings show a typical pattern and that the ratio of each size differs from reality. Therefore, the specific size and the like are should be determined with reference to the following description. It goes without saying that the relationship and the ratio of sizes among the drawings may be different from each other.

The tire 101 has a pair of bead cores 111 and 112, bead fillers 113 and 114, and a carcass 115 containing a carcass ply. The tire 101 also has an inner liner 116 formed of a thermoplastic resin film; and a rubber layer 117 disposed between the carcass 115 and the inner liner 116. The inner liner 116 is disposed on the tire inside of the carcass 115. As shown in FIG. 6, the tire 101 also has an adhesive layer 131 (not shown in FIG. 5) bonding the inner liner 116 to the rubber layer 117.

The bead fillers 113 and 114 extend from the bead cores 111 and 112 to the outside in the tire radial direction, respectively. The carcass 115 is turned up at the bead cores 111 and 112 in the outside in the tread width direction of the bead fillers 113 and 114, respectively, to form the frame of a tire case with a horseshoe shape. A belt layer 118 formed of a plurality of belt layers is disposed on the outside in the tire radial direction of the carcass 115. A belt reinforcement layer 119 is disposed on the outside in the tire radial direction of the belt layer 118. A tread part 121 is disposed on the outside in the tire radial direction of the belt reinforcement layer 119 with rubber for tread part. A side wall part 122 is formed on the outside in the tread width direction of the carcass 115 with rubber for side wall.

The tire 101 according to an embodiment of the present invention is filled with gas such as air or nitrogen. The structure of the tire 101 is illustrative only and thus not limited to the structure shown in FIG. 5. For example, the tire includes the ones for cars, heavy load, off-the-road, motorcycles, aircraft, agriculture, and the like.

In an embodiment of the present invention, the dynamic storage modulus at −20° C. of the thermoplastic resin film forming the inner liner 116 is defined as $E_1'$, the dynamic storage modulus at −20° C. of the rubber layer 117 is defined as $E_2'$, and the dynamic storage modulus at −20° C. of the adhesive layer 131 is defined as $E_4'$.

The rubber layer 117 has a dynamic storage modulus $E_2'$ at −20° C. of $1.0 \times 10^5$ to $1.0 \times 10^7$ Pa and a thickness of 0.1 to 1 mm. The rubber layer 117 will be explained in detail below.

In an embodiment, the modulus is a dynamic storage modulus (E') measured at −20° C. with a spectrometer available from Ueshima Seisakusho Co., Ltd. at an initial strain of 10%, a dynamic strain of 0.1%, and a frequency of 15 Hz.

Carcass

The carcass 115 consists of one or two more carcass plies. The carcass ply has a structure with fiber such as polyester being covered with coating rubber.

The material of this coating rubber is not limited in particular. For example, diene rubber is used as the material. This diene rubber includes a natural rubber (NR), an isoprene synthetic rubber (IR), a cis-1,4-polybutadiene rubber (BR), a syndiotactic 1,2-polybutadiene rubber (1,2BR), and a styrene-butadiene rubber (SBR). These diene rubbers may be used alone or in combination of two or more kinds.

In the coating rubber, compounding ingredients typically used in rubber field, such as reinforcing filler, softener, antioxidant, vulcanizer, vulcanization accelerator for rubber, antiscorching agent, zinc oxide, and stearic acid can appropriately be mixed in accordance with the intended use in addition to the above-mentioned rubber components. As these compounding ingredients, commercially available products can preferably be used.

Inner Liner

The inner liner 116 has the thermoplastic resin film. In the present embodiment, the inner liner 116 may be a multi-layered laminate formed of a plurality of resin layers containing the thermoplastic resin film. In the present embodiment, the thermoplastic resin film forms the layer A containing the thermoplastic resin composition.

The dynamic storage modulus $E_1'$ at −20° C. of the thermoplastic resin film is preferably $1 \times 10^8$ to $1 \times 10^9$ Pa, more preferably $2 \times 10^8$ to $8 \times 10^8$ Pa, further more preferably $4 \times 10^8$ to $6 \times 10^8$ Pa. The dynamic storage modulus $E_1'$ of $1 \times 10^8$ Pa or more can allow the thermoplastic resin film with a low gas permeability to be used, which is preferable from the viewpoint of the improvement of the gas barrier property. The structure of the inner liner 116 in the tire according to an embodiment is as follows.

The inner liner 116 may be formed of a single layer of thermoplastic resin film (layer A), two or more layers of thermoplastic resin films (layer A), or two or more layers in combination of a thermoplastic resin film (layer A) and another layer (layer B). The another layer (layer B) is preferably a layer formed of a resin composition containing an elastomer, which has a high extensibility. This can improve the extensibility of the entire inner liner 116 even when the extensibility of the thermoplastic resin film (A layer) is low.

When the inner liner 116 is a laminate, the dynamic storage modulus $E_1'$ at −20° C. of the thermoplastic resin film is the dynamic storage modulus of the entire thermoplastic resin film (layer A).

The thickness of the inner liner 116 is preferably 0.1 μm or more and 1,000 μm or less, more preferably 0.5 μm or more and 750 μm or less, further more preferably 1 μm or more and 500 μm or less.

Layer Structure (Multi-layered Laminate)

In the present embodiment, the multi-layered laminate described in the above-mentioned first embodiment can be applied to the multi-layered laminate forming the inner liner 116.

Rubber Layer

Structure of Rubber Layer

In the tire according to the present embodiment, the rubber component forming the rubber layer 117 is not limited in particular. For example, diene rubber is used as the rubber component. This diene rubber includes a natural rubber (NR), an isoprene synthetic rubber (IR), a cis-1,4-polybutadiene rubber (BR), a syndiotactic 1,2-polybutadiene rubber (1,2BR), and a styrene-butadiene rubber (SBR). These diene rubbers may be used alone or in combination of two or more kinds.

In the coating rubber, compounding ingredients typically used in rubber field, such as reinforcing filler, softener, antioxidant, vulcanizer, vulcanization accelerator for rubber, antiscorching agent, zinc oxide, and stearic acid can appropriately be mixed in accordance with the intended use in addition to the above-mentioned rubber components. As these compounding ingredients, commercially available products can preferably be used.

The rubber layer 117 has a dynamic storage modulus $E_2'$ at −20° C. of $1.0 \times 10^5$ to $1.0 \times 10^7$ Pa and a thickness of 0.1 to 1 mm.

The dynamic storage modulus $E_2'$ at −20° C. of the rubber layer 117 is preferably $1.0 \times 10^5$ to $1.0 \times 10^6$ Pa, more preferably $1.0 \times 10^5$ to $5.0 \times 10^5$ Pa. The dynamic storage modulus $E_2'$ of $1.0 \times 10^5$ Pa or more can sufficiently secure the workability of rubber mixing. The thickness of the rubber layer 117 can be decreased to fall within the range of 0.1 to 1 mm without the strength being impaired. The dynamic storage modulus $E_2'$ of $1.0 \times 10^7$ or less can reduce the deformation of the carcass, leading to the suppressed deformation of the thermoplastic resin film and the improved anti-crack property in the low-temperature environment.

The thickness of the rubber layer 117 is preferably 0.1 to 0.6 mm, more preferably 0.1 to 0.4 mm. The thickness of the rubber layer 117 falling within the above-mentioned range can maintain the following property to the carcass 115, reduce the stress generated on a thermoplastic resin film forming the inner liner 116, and suppress the fractures and the cracks of the thermoplastic resin film, at −20° C. Even if fractures and cracks of the thermoplastic resin film are generated, the growth of the fractures and the cracks can be suppressed.

In the rubber layer 117, compounding ingredients typically used in rubber field, such as softener, vulcanizer, vulcanization accelerator, filler, tackifier resin, antioxidant, antiscorching agent, zinc oxide, and stearic acid can appropriately be mixed in accordance with the intended use in addition to the above-mentioned rubber components. As these compounding ingredients, commercially available products can preferably be used. The rubber layer 117 can be prepared by mixing the components with, for example, a Banbury mixer, a roll, or the like. The rubber layer 117 thus obtained is disposed between the carcass 115 and the thermoplastic resin film forming the inner liner 116.

Softener

The softener described in the first embodiment can be mixed in the rubber layer 117. The above-mentioned softener is preferably contained in a content of 5 to 50 parts by mass, more preferably 5 to 40 parts by mass, further more preferably 5 to 30 parts by mass based on 100 parts by mass of the rubber components forming the rubber layer 117.

The mixing amount of the softener to the rubber components falling within the above-mentioned range can allow the rubber layer 117 to have a dynamic storage modulus $E'$ at −20° C. of $1.0 \times 10^5$ to $1.0 \times 10^7$ Pa. The softeners can be used alone selected from the above-mentioned softeners or in combination of one or more kinds.

Vulcanizer and Vulcanization Accelerator

The vulcanizer and vulcanization accelerator described in the first embodiment can be mixed in the rubber layer 117. The mixing amount can be the same as that of the first embodiment.

Optional Components

The rubber layer 117 can optionally contain the same optional components described in the first embodiment, such as filler, tackifier resin, stearic acid, zinc oxide, antioxidant in addition to the above-mentioned components.

Adhesive Layer

In the present embodiment, the adhesive resin forming the adhesive layer 131 is not limited in particular as long as being able to bond the inner liner 116 to the rubber layer 117. For example, the adhesive resin includes one-part or two-part curable adhesive based on polyurethane and polyester.

In the tire 101 according to an embodiment of the present invention, the dynamic storage modulus at −20° C. of the thermoplastic resin film forming the inner liner 116 is defined as $E_1'$, the dynamic storage modulus at −20° C. of the rubber layer 117 is defined as $E_2'$, and the dynamic storage modulus at −20° C. of the adhesive layer 131 is defined as $E_4'$. These moduluses has the following relationship.

$$E_1' > E_4' > E_2'$$

This relationship decreases the difference of dynamic storage modulus at the low temperature between adjacent members, i.e., between the inner liner 16 (thermoplastic resin film) and the adhesive layer 131 and between the adhesive layer 131 and the rubber layer 117. This can lead to excellent following property to the deformation of the tire shape such as the bending of a tire and particularly improve the anti-crack property of the thermoplastic resin film, at the low temperature.

The difference of dynamic storage modulus between $E_4'$ of the adhesive layer 131 and $E_2'$ of the rubber layer 117 is preferably $9.3 \times 10^7$ to $3.1 \times 10^8$ Pa, more preferably $9.3 \times 10^7$ to $2.4 \times 10^8$ Pa, further more preferably $9.3 \times 10^7$ to $1.8 \times 10^8$ Pa. The difference of dynamic storage modulus of $9.3 \times 10^7$ Pa or more can bring $F_4'$ of the adhesive layer 131 close to $E_1'$ of the thermoplastic resin film (layer A). This can prevent the strain of the tire from being caused by the deformation between the thermoplastic resin film (layer A) and the adhesive layer 131 to improve the anti-crack property. The difference of dynamic storage modulus of $3.1 \times 10^8$ Pa or less decreases the difference between $E_4'$ of the adhesive layer 131 and $E_2$ of the rubber layer 117 to improve the anti-crack property in the low temperature environment.

Method of Producing Tire

Overview

The method of producing the tire 101 according to an embodiment of the present invention will be explained. The method of producing the tire 101 has two main steps S1 and S2.

The step S1 forms a laminate with the inner liner 116 (thermoplastic resin film) being applied to the rubber layer 117 through the adhesive layer 131.

The step S2 disposes the laminate formed in the step S1 so that the inner liner 116 side faces to a molding drum and then disposes the carcass 115 on the laminate. In the step S2, the laminate formed in the step S1, the carcass 115 formed of an unvulcanized rubber, and a member typically used for producing a tire are overlapped on the tire molding drum and applied to each other. The inner liner 116 having the thermoplastic resin film, the adhesive layer 131, the rubber layer 117, and the carcass 115 are wrapped and overlaid around the outer circumferential face of the tire molding drum in this order.

Furthermore, the belt layer 118, a rubber element forming the tread part 121, and a rubber element forming the side wall part 122 are wrapped and overlaid around the carcass. As a result, a green tire is formed. Then, this green tire was vulcanized by heating at a temperature of 120° C. or more, preferably 125 to 200° C., more preferably 130 to 180° C. to produce the tire 101.

Step S1

One example of the method of producing a laminate with the thermoplastic resin film being applied to the rubber layer 117 through the adhesive layer 131 will be explained in reference to the attached drawings. FIG. 7 shows a schematic diagram of a film application device 200 forming a laminate with the thermoplastic resin film being applied to the rubber layer 117 through the adhesive layer 131.

The film application device 200 is provided with a supply conveyer 201, a resin film roll support axis 202, a lined sheet peeler 203 as a lined sheet peeling means, a lined sheet winding drum 204, a pressing roller 205, and a film cutting means 206.

The supply conveyer 201 has a conveying surface on the upper side to flatly convey an unvulcanized rubber sheet 220. In an embodiment, the unvulcanized rubber sheet 220 is the continuum of the rubber layer 117. The supply conveyer 201 has the capability of supplying a laminate with the thermoplastic resin film being applied to the surface of the unvulcanized rubber sheet 220 to a tire molding drum (not shown) disposed on the downstream side in the conveyance direction.

The resin film roll support axis 202 stores the thermoplastic resin film to be supplied to the unvulcanized rubber sheet 220 conveyed by the supply conveyer 201, which is disposed above the conveyance side of the supply conveyer 201.

The continuum 221 of the thermoplastic resin film is wound to a resin film roll 207. The continuum 221 of the thermoplastic resin film is lined with a backing sheet 222 formed of, for example, a PET film for the purpose of preventing adjacent layers from tightly adhering to each other and of reinforcing the continuum 221.

The lined sheet peeler 203 changes the flow direction of the backing sheet 222 applied to the continuum 221 of the thermoplastic resin film drawn out from the resin film roll 207 to the supply conveyer 201 and also peels the backing sheet 222 off from the continuum 221 of the thermoplastic resin film. The lined sheet winding drum 204 winds up the backing sheet 222 peeled off from the thermoplastic resin film.

The pressing roller 205 holds the continuum 221 of the thermoplastic resin film from which the backing sheet 222 has been peeled off to the surface of the unvulcanized rubber sheet 220 to tightly bond these members to each other. The film cutting means 206 cuts the thermoplastic resin film in a predetermined length, including a knife edge and a shearing edge.

To apply the continuum 221 of the thermoplastic resin film to the unvulcanized rubber sheet 220 with a film application device 200 as described above, the continuum 221 of the thermoplastic resin film is sent off from the resin film roll 207 to the conveyance side of the supply conveyer 201. The backing sheet 222 applied to the continuum 221 of the thermoplastic resin film is peeled off from the continuum 221 while being conveyed and then wound up by the lined sheet winding drum 204.

The continuum 221 of the thermoplastic resin film from which the backing sheet 222 has been peeled off is overlapped on the unvulcanized rubber sheet 220 conveyed by the supply conveyer 201 while a predetermined adjustment is conducted. Subsequently, through the pressing action of the pressing roller 205, the continuum 221 of the thermoplastic resin film is sequentially bonded to the surface of the unvulcanized rubber sheet 220. At this time, the adhesive layer is disposed between the continuum 221 of the thermoplastic resin film and the unvulcanized rubber sheet 220.

Then, the continuum 221 of the thermoplastic resin film applied to the unvulcanized rubber sheet 220 is cut off in a predetermined length by the film cutting means 206. As a result, a laminate with the thermoplastic resin film being applied to the rubber layer 117 through the adhesive layer 131 is formed. In other words, the thermoplastic resin film lined with the rubber layer can be formed.

Process of Disposing Adhesive Layer Between Inner Liner and Rubber Layer

When the adhesive layer 131 between the inner liner 116 and the rubber layer 117, the adhesive layer 131 formed in liquid state may be applied to between the inner liner 116 and the rubber layer 117, or the adhesive layer 131 formed in a sheet shape may be disposed between the inner liner 116 and the rubber layer 117.

When the adhesive layer 131 formed in liquid state is applied to between the inner liner 116 and the rubber layer 117, a coating liquid formed by dissolving an adhesive layer 131 composition in a good solvent is applied to at least one of the outside surface of the inner liner 116 (when wrapped around a tire molding drum) and the inside surface of the carcass 115 (when wrapped around a molding drum). Subsequently, the inner liner 116, the rubber layer 117, and the carcass 115 are wrapped and overlaid around the outer circumferential face of a tire molding drum in this order.

As the good solvent, an organic solvent having a Hildebrand solubility parameter δ of 14 to 20 MPa$^{1/2}$ is used, which is a good solvent for rubber components. The organic solvent can include toluene, xylene, n-hexane, cyclohexane, chloroform, and methyl ethyl ketone. These organic solvents may be used alone or in combination of two or more kinds.

The concentration of the solid components in the coating liquid thus prepared is appropriately selected with consideration on the coating property and the handleability, generally falling within the range of 5 to 50% by mass and preferably 10 to 30% by mass.

When the adhesive layer 131 formed in sheet shape is disposed between the inner liner 116 and the rubber layer 117, the inner liner 116, the adhesive layer 131 formed in sheet shape, the rubber layer 117, and the carcass 115 are wrapped and overlaid around the outer circumferential face of the tire molding drum in this order. In this case, the adhesive layer 131 formed in sheet shape may be previously applied to either the inner liner 116 or the rubber layer 117.

As described above, since a laminate with the thermoplastic resin film as the inner liner 116 being applied to the rubber layer 117 is previously prepared, the handleability of the thermoplastic resin film is improved. This can improve the production efficiency and reduce production defects such as the appearance of wrinkles on the thermoplastic resin film and the inclusion of air between the thermoplastic resin film and the rubber layer 117.

3. Third Embodiment

The structure of the tire according to the third embodiment of the present invention will be explained in detail below.

The present invention is a tire having a pair of bead parts abutting a rim; a pair of side wall parts stretched to the respective bead parts, the side wall parts facing each other; a tread part holding the road; a tire shoulder part having a contact with the side wall part and stretching from the tread end on the outside in the width direction of the tread part to the inside in the tire radial direction of the tread part; a carcass formed in horseshoe shape between the pair of bead parts and disposed on the other side different from the road side of the tread part; a belt layer disposed between the carcass and the tread part; an inner liner having a thermoplastic resin film, the inner liner being disposed on the other side different from the road side of the carcass; and a rubber layer disposed between the carcass and the inner liner. The rubber layer has a dynamic storage modulus E' at −20° C. of $1.0 \times 10^5$ to $1.0 \times 10^7$ Pa and a thickness of 0.1 to 1 mm. The rubber layer is disposed in a region excluding the central region in the tread width direction of the tread part but including regions each between a first part as a part of the carcass corresponding to a belt end located on an outermost side in the tread width direction of the belt layer and a second part where the interval between parts of the carcass in the respective side wall parts facing each other is maximized.

Tire
Structure of Tire

FIG. 8 shows a sectional view of the tire shown as an embodiment of the present invention in the tread width direction and the tire radial direction. FIG. 9 shows an enlarged sectional view illustrating the region I of FIG. 8.

In the description of the following drawings, the same or similar reference numerals are assigned to the same or similar parts. However, it should be noted that the drawings show a typical pattern and that the ratio of each size differs from reality. Therefore, the specific size and the like are should be determined with reference to the following description. It goes without saying that the relationship and the ratio of sizes among the drawings may be different from each other.

The tire 301 has a pair of bead parts 302 abutting a rim; a pair of side wall parts 303 stretched on the respective bead parts 302, the side wall parts facing each other; a tread part 304 holding the road; and a tire shoulder part 305 stretched on the side wall part 303 from the tread end 341 on the outside in the width direction of the tread part to the inside in the tire radial direction of the tread part.

The tire 301 also has a pair of bead cores 311 and 312, bead fillers 313 and 314, and a carcass 315 containing a carcass ply. The tire 301 also has an inner liner 316 formed of a thermoplastic resin film; and a rubber layer 317 disposed between the carcass 315 and the inner liner 316. The inner liner 316 is disposed on the tire inside of the carcass 315. As shown in FIG. 9, the tire 301 also has an adhesive layer 331(not shown in FIG. 8) bonding the inner liner 316 to the rubber layer 317.

The bead fillers 313 and 314 extend from the bead cores 311 and 312 to the outside in the tire radial direction, respectively. The carcass 315 is turned up at the bead cores 311 and 312 in the outside in the tread width direction of the bead fillers 313 and 314, respectively, to form the frame of a tire case with a horseshoe shape. A belt layer 318 formed of a plurality of belt layers is disposed on the outside in the tire radial direction of the carcass 315. A belt reinforcement layer 319 is disposed on the outside in the tire radial direction of the belt layer 318.

The tire 301 according to the embodiment of the present invention is filled with gas such as air or nitrogen. The structure of the tire 301 is illustrative only and thus not limited to the structure shown in FIG. 8. For example, the tire includes the ones for cars, heavy load, off-the-road, motorcycles, aircraft, agriculture, and the like.

In an embodiment of the present invention, the dynamic storage modulus at −20° C. of the thermoplastic resin film forming the inner liner 316 is defined as $E_1'$, the dynamic storage modulus at −20° C. of the rubber layer 317 is defined as $E_2'$, and the dynamic storage modulus at −20° C. of the adhesive layer 331 is defined as $E_4'$.

The rubber layer 317 has a dynamic storage modulus $E_2'$ at −20° C. of $1.0 \times 10^5$ to $1.0 \times 10^7$ Pa and a thickness of 0.1 to 1 mm. The rubber layer 317 will be explained in detail below.

In an embodiment, the modulus is a dynamic storage modulus (E') measured at −20° C. with a spectrometer available from Ueshima Seisakusho Co., Ltd. at an initial strain of 10%, a dynamic strain of 0.1%, and a frequency of 15 Hz.

The location of the rubber layer 317 in the tire 301 according to an embodiment will be explained.

The carcass 315 has a first part C1 corresponding to a belt end located on an outermost side in the tread width direction of the belt layer 318 and a second part C2 where the interval CW between the parts of the carcass 315 in the respective side wall parts 303 facing each other is maximized.

The inner liner 316 is disposed across the entire inner surface of the tire 301. The rubber layer 317 is disposed in a region excluding the central region in the tread width direction of the tread part 304 but including regions each between the first part C1 and the second part C2. The region in which the rubber layer 317 is disposed includes a tire shoulder part 305.

The excluded central region has a length equal to 70 to 80% of the length between the belt ends 381 of the belt layer 318 (TW in FIG. 4) from the sectional view in the tire radial direction and the tread width direction. In tire 301 according to the present embodiment, the rubber layer 317 is not disposed in this central region.

The tire shoulder part 305 is easily deformed during the normal use of the tire 301. Stress is easily concentrated in the inner liner 316 disposed on the tire inner surface of the tire shoulder part 305. In the present embodiment, since the rubber layer 317 is disposed in the region including regions each between the first part C1 and the second part C2 of the carcass 315, the part in the inner liner 316 on which stress is easily concentrated can be reinforced. The part in the inner liner 316 on which stress is easily concentrated is specifically a part of the inner liner 316, which corresponds to the tire shoulder part 305.

From the sectional view in the tire radial direction and the tread width direction, the rubber layer 317 can covers 70% or less of the area of the inner liner 316. The rubber layer 317 preferably covers 50% or less of the area of the inner liner 316. On the other hand, the rubber layer 317 preferably covers 20% or more of the area of the inner liner 316. If covering less than 20% of the area of the inner liner 316, the rubber layer 317 cannot cover the tire shoulder part 305 which is bent most in a tire. This may cause excessive deformation in the inner liner 316.

Setting the rubber layer 317 to cover the above-mentioned percentage range of the area of the inner liner 316 can maintain the effect on the reinforcement of the inner liner 316 and suppress the increase in the total weight of the tire 301 caused by the rubber layer 317.

Carcass

The carcass 315 consists of one or two more carcass plies. The carcass ply has a structure with fiber such as polyester being covered with coating rubber.

The material of this coating rubber is not limited in particular. For example, diene rubber is used as the material. This diene rubber includes a natural rubber (NR), an isoprene synthetic rubber (IR), a cis-1,4-polybutadiene rubber (BR), a syndiotactic 1,2-polybutadiene rubber (1,2BR), and a styrene-butadiene rubber (SBR). These diene rubbers may be used alone or in combination of two or more kinds.

In the coating rubber, compounding ingredients typically used in rubber field, such as reinforcing filler, softener, antioxidant, vulcanizer, and vulcanization accelerator for rubber, antiscorching agent, zinc oxide, and stearic acid can appropriately be mixed in accordance with the intended use in addition to the above-mentioned rubber components. As these compounding ingredients, commercially available products can preferably be used.

Inner Liner

The inner liner 316 has the thermoplastic resin film. In the present embodiment, the inner liner 316 may be a multi-layered laminate formed of a plurality of resin layers containing the thermoplastic resin film. In the present embodiment, the thermoplastic resin film forms the layer A containing the thermoplastic resin composition.

The dynamic storage modulus $E_1'$ at $-20°$ C. of the thermoplastic resin film is preferably $1\times10^8$ to $1\times10^9$ Pa, more preferably $2\times10^8$ to $8\times10^8$ Pa, further more preferably $4\times10^8$ to $6\times10^8$ Pa. The dynamic storage modulus $E_1'$ of $1\times10^8$ Pa or more can allow the thermoplastic resin film with a low gas permeability to be used, which is preferable from the viewpoint of the improvement of the gas barrier property.

The structure of the inner liner 316 in the tire according to an embodiment is as follows. The inner liner 316 may be formed of a single layer of thermoplastic resin film (layer A), two or more layers of thermoplastic resin films (layer A) or two or more layers in combination of a thermoplastic resin film (layer A) and another layer (layer B). The another layer (layer B) is preferably a layer formed of a resin composition containing an elastomer, which has a high extensibility. This can improve the extensibility of the entire inner liner 316 even when the extensibility of the thermoplastic resin film (A layer) is low.

When the inner liner 316 is a laminate, the dynamic storage modulus $E_1'$ at $-20°$ C. of the thermoplastic resin film is the dynamic storage modulus of the entire thermoplastic resin film (layer A).

The thickness of the inner liner 316 is preferably 0.1 μm or more and 1,000 μm or less, more preferably 0.5 μm or more and 750 μm or less, further more preferably 1 μm or more and 500 μm or less.

Layer Structure (Multi-layered Laminate)

In the tire 301 according to the present embodiment, the multi-layered laminate described in the above-mentioned first embodiment can be applied to the multi-layered laminate forming the inner liner 316.

Rubber Layer

In the tire 301 according to the embodiment, the rubber layer described in the second embodiment is applicable to the rubber layer 317.

Adhesive Layer

In the embodiment, the adhesive layer described in the second embodiment is applicable to the adhesive layer 331.

Method of Producing Tire

Overview

The method of producing the tire 301 according to an embodiment of the present invention will be explained. In the method of producing the tire 301, the inner liner 316 on which the adhesive layer 331 is previously disposed is disposed on a tire molding drum so that it faces to the molding drum. Moreover, the rubber layer 317, the carcass 315, and a member typically used for producing a tire are sequentially overlapped on the adhesive layer and applied to each other. As a result, a green tire is formed.

Then, this green tire was vulcanized by heating at a temperature of 120° C. or more, preferably 125 to 200° C., more preferably 130 to 180° C. to produce the tire 301.

EXAMPLES

1. First Embodiment

The present invention will be explained in detail below with reference to examples. However, the present invention is not limited to the examples. The method of measuring and evaluating the properties will be explained first.

Measurement Method and Evaluation Method (1) Dynamic Storage Modulus E' at $-20°$ C.

The dynamic storage modulus (E') of each sample (size: 5 mm, length: 40 mm) was measured at $-20°$ C. with a spectrometer available from Ueshima Seisakusho Co., Ltd. at an initial strain of 10%, a dynamic strain of 0.1%, and a frequency of 15 Hz.

(2) Tg

The modified diene polymer was measured while the temperature was increased at 15° C./minute after cooled to $-150°$ C. with a differential scanning calorimeter (DSC) "RDC220" available from SEIKO. The tangents to the baseline were drawn before and after a peak in the DSC curve. The temperature of the middle point between two tangents was read and defined as Tg.

(3) Epoxidation Rate of Epoxy-modified Diene Polymer

An epoxidized butadiene rubber (EBR) was dissolved in deuterated chloroform. The rate h(ppm) of integrated value of the carbon-carbon double bond moiety to that of the aliphatic moiety was determined by nuclear magnetic resonance (NMR (JNM-ECA series available from JEOL Ltd.)) spectrochemical analysis. Then, the epoxidation rate was calculated from by using the following expression.

$$(\text{Epoxidation Rate } E\ \%) = 3\times h(2.69)/(3\times h(2.69) + 3\times h(5.14) + h(0.87))\times 100$$

(4) Gas Barrier Property

A 5-layered film and a 21-layered film described later were subjected to humidity conditioning at 20° C. and 65% RH for 5 days. Two sample pieces were prepared from each of the 5-layered film and the 21-layered film after humidity conditioning, respectively, to measure their oxygen transmission rates at 20° C. and 65% RH in accordance with the method described in JIS-K7126 (isopiestic method) with a "MOCON OX-TRAN2/20" available from MODERN-CONTROLS, INC. The average of the oxygen transmission rates per film was determined (unit: mL/m$^2$·day·atm) and expressed with an index of 100 representing the average of oxygen transmission of Comparative Example 1 to evaluate the gas barrier property. A lower index value shows more excellent gas barrier property.

(5) Interlayer Peel Strength

The interlayer peel strength was measured by T-type peel test conducted at a tension rate of 50 mm/minute under 23°

C. and 50% RH atmosphere in accordance with JIS-K6854 after the laminate is heated at 180° C. for 15 minutes.

(6) Presence of Cracks after Drum Test Run

The tires inflated at an internal air pressure of 140 kPa were pressed to a drum rotating at a driving speed of 80 km/h under a load of 6 kN and run 1,000 km at −20° C. The appearance of the inner liner of the tire after the drum run was visually observed to evaluate the presence of cracks.

(7) Gas Barrier Property of Tire after Drum Test Run

Two sample pieces with a size of 10 cm×10 cm were cut out from the side face of the tire, subjected to humidity conditioning at 20° C. and 65% RH for 5 days to measure their oxygen transmission rates at 20° C. and 65% RH in accordance with the method described in JIS-K7126 (isopiestic method) with a "MOCON OX-TRAN2/20" available from MODERNCONTROLS, INC. The average of the oxygen transmission rates was determined (unit: mL/m$^2$·day·atm) and expressed with an index of 100 representing the average of oxygen transmission rate of a sample of the multi-layered laminate obtained in Comparative Example 1 to evaluate the gas barrier property. A lower index value shows more excellent gas barrier property.

(8) Characteristics of Ethylene-Vinyl Alcohol Copolymer (EVOH)

The content of ethylene and the saponification degree of the EVOH were calculated based on a spectrum obtained by the measurement of $^1$H-NMR [with a JNM-GX-500 type, available from NIPPON DENSHI Co., Ltd.] using deuterated dimethyl sulfoxide as the solvent.

For the measurement of the melt flow rate (MFR) of the EVOH, the sample was introduced into a cylinder having an inner diameter of 9.55 mm and a length of 162 mm of a MELT INDEXER L244 (available from TAKARA KOGYO Co., Ltd.) and melted at 190° C. The melted sample was subjected to a uniform load by using a plunger having a weight of 2,160 g and a diameter of 9.48 mm to be extruded from an orifice having a diameter of 2.1 mm formed at the center of the cylinder. The MFR was determined from the amount of the extruded resin per unit time (g/10 minutes). When the melting point of the EVOH is around or more than 190° C., the MFR was determined at a plurality of temperatures higher than the melting point under a load of 2,160 g. The obtained data were plotted on a semi-logarithmic graph with the inverse of the absolute temperature as the horizontal axis and the logarithm of the determined MFR as the vertical axis, and the value obtained by extrapolation at 190° C. was determined as the melt flow rate (MFR) to be obtained.

Preparation Example 1

Preparation of Thermoplastic Resin Film-containing Layer (5-layered Film)

Through the use of an EVOH (E205 available from KURARAY Co., Ltd) and a thermoplastic polyurethane (TPU) (KURAMIRON 3190 available from KURARAY Co., Ltd., a 5-layered film (TPU/EVOH/TPU/EVOH/TPU layers) was prepared by coextrusion under the following condition with a 5-layer extruder capable of extruding two types of materials. The thicknesses of the layers are 2 μm/20 μm/2 μm/20 μm/10 μm, respectively.

Extrusion Temperatures of Resins: C1/C2/C3/C4/C5/Die=170/170/170/220/220/220° C.

Type of extruder for resins:

TPU: extruder 25 mmφ, P25-18AC (available from OSAKA SEIKI KOSAKU Co., Ltd.)

EVOH: laboratory extruder 20 mmφ (ME type), CO-EXT (available from TOYO SEIKI Co., Ltd.)

T-die: extruder (width: 500 mm) used for a 5-layered film containing two types of materials (available from PLASTIC KOGAKU KENKYUSHO Co., Ltd.)

Temperature of cooling roll: 50° C.

Speed of winding: 4 m/minute

The gas barrier property of this inner liner was measured by the above-mentioned measurement method. The results are shown in Table 1.

Preparation Example 2

Preparation of Thermoplastic Resin Film-containing Layer (21-layered Film)

Through the use of an EVOH (E205 available from KURARAY Co., Ltd) and a thermoplastic polyurethane (TPU) (KURAMIRON 3190 available from KURARAY Co., Ltd., a 21-layered film (TPU/EVOH . . . /EVOH/TPU layers, including 11 TPU layers and 10 EVOH layers) was prepared by coextrusion under the following condition with a 21-layer extruder capable of extruding two types of materials. The thickness of each TPU layer is 2 μm, and the thickness of each modified EVOH layer is 1 μm.

A multi-layer film with 21-layers was extruded at a feed block temperature of 210° C. and a die temperature of 208° C.

Type of extruder for resins:

TPU: extruder 25 mmφ, P25-18AC (available from OSAKA SEIKI KOSAKU Co., Ltd.)

EVOH: laboratory extruder 20 mmφ (ME type), CO-EXT (available from TOYO SEIKI Co., Ltd.)

T-die: extruder (width: 500 mm) used for a 21-layered film containing two types of materials (available from PLASTIC KOGAKU KENKYUSHO Co., Ltd.)

Temperature of cooling roll: 50° C.

Speed of winding: 4 m/minute

The gas barrier property of this inner liner was measured by the above-mentioned measurement method. The results are shown in Table 1.

Preparation Example 3

Preparation of Epoxidized Butadiene Rubber (EBR (1))

100 g of BR-150B (high cis BR available from UBE INDUSTRIES LTD.) was cut out into granules, each of which has a size of about 0.5 g, added in 1200 mL of toluene in a 5 L glass container, and dissolved with being stirred for 24 hours. Subsequently, 2 mL of formic acid was added in the solution, and the solution was heated to 50° C. in a water bath. While the solution was stirred, 60 g of a 30% by mass of an aqueous hydrogen peroxide solution was added dropwise for 30 minutes. After the dropwise addition ended, the solution was continuously stirred while the temperature was maintained at 50° C. Then, 0.3 g of BHT (dibutyl hydroxy toluene) was added 5 hours later. After cooled to room temperature, the reaction solution was added in 5 L of methanol to precipitate a rubber component. The precipitate was spread over a wide tray, and dried in air for 24 hours and then under reduced pressure to obtain 99 g of EBR (1). The epoxidation rate of this EBR (1) was calculated by the above-mentioned method to be 2.1% by mole.

Preparation Example 4

Preparation of Epoxidized Butadiene Rubber (EBR (2))

100 g of BR-150B (high cis BR available from UBE INDUSTRIES LTD.) was cut out into granules, each of which has a size of about 0.5 g, added in 1200 mL of toluene in a 5 L glass container, and dissolved with being stirred for 24 hours. Subsequently, 6 mL of formic acid was added in the solution, and the solution was heated to 50° C. in a water bath. While the solution was stirred, 130 g of 30% by mass of an aqueous hydrogen peroxide solution was added dropwise for 30 minutes. After the dropwise addition ended, the solution was continuously stirred while the temperature was maintained at 50° C. Then, 0.3 g of BHT was added 7 hours later. After cooled to room temperature, the reaction solution was added in 5 L of methanol to precipitate a rubber component. The precipitate was spread over a wide tray, and dried in air for 24 hours and then under reduced pressure to obtain 99 g of EBR (2). The epoxidation rate of this EBR (2) was calculated by the above-mentioned method to be 48.5% by mole.

Preparation Example 5

Preparation of Rubber Sheet with No Adhesion

The rubber composition containing the following components are prepared to produce a rubber sheet (thickness: 0.4 mms) with an extruder.
Rubber Composition
Natural rubber: 50 parts by mass
SBR (SBR1712 available from JSR Co., Ltd): 68.75 parts by mass
GPF N-660 (carbon black) (50S available from ASAHI CARBON Co., Ltd): 43 parts by mass
Softener (TOP available from DAIHACHI CHEMICAL INDUSTRY CO., LTD.): 3 parts by mass
Antioxidant (Nocrac224-S available from OUCHI SHINKO KAGAKU KOGYO Co., Ltd.): 1.5 parts by mass
Stearic acid (available from ASAHI DENKA KOGYO Co., Ltd): 1.5 parts by mass
Vulcanization accelerator (Accel M available from Kawaguchi Chemical Industry Co., LTD.): 0.5 parts by mass
Vulcanization accelerator (Accel CZ available from Kawaguchi Chemical Industry Co., LTD.): 1 part by mass
Zinc oxide (available from HIGHTECH): 4 parts by mass
Sulfur (available from KARUIZAWA SEIRENSHO Co., Ltd.): 2.66 parts by mass Examples 1 to 4

(1) Preparation of Rubber Layer

The components, the types and the amounts of which shown in table 1, were kneaded by a conventional method to form a rubber layer in a sheet shape with a thickness of 400 μm with an extruder with a thickness of 400 μm with an extruder.

A part of the above-mentioned rubber layer was vulcanized by heating at 160° C. for 20 minutes to obtain a vulcanized rubber layer. The dynamic storage modulus $E_2'$ at −20° C. and the Tg of the vulcanized rubber layer were measured by the above-mentioned measurement method. The results are shown in Table 1.

(2) Preparation of Laminate

The rubber layer was applied to one side of the 5-layered film obtained in Preparation Example 1 with an electron beam irradiator "CURETRON EBC200-100 for industrial production" available from NISSHIN HIGH VOLTAGE Co., Ltd. to prepare a laminate.

The interlayer peel strength of the vulcanized laminate was measured in accordance with the above-mentioned method. The results are shown in Table 1.

(3) Preparation of Tire

The laminate was wrapped around a tire molding drum so that the thermoplastic resin film-containing layer is faced to the drum. Subsequently, a carcass was wrapped on the laminate. On this carcass, a belt layer, a rubber member for the tread part, and a rubber member for a side wall part were sequentially wrapped and overlaid. Then, the drum was removed to obtain a green tire.

This green tire was vulcanized by heating to prepare a pneumatic tire (195/65R15) as shown in FIG. 4.

The gas barrier property and the presence of cracks of the obtained tire after drum test run were evaluated by the above-mentioned measurement method. The results are shown in Table 1.

Comparative Examples 1 to 2

(1) Preparation of Rubber Layer

A rubber was prepared in the same manner as Examples 1 to 4. The dynamic storage modulus $E_2'$ at −20° C. and the Tg of the vulcanized rubber layer were measured in the same manner as Examples 1 to 4. The results are shown in Table 1.

(2) Preparation of Laminate

The rubber layer was applied to one side of the 5-layered film obtained in Preparation Example 1, and the rubber sheet with no adhesion obtained by Preparation Example 5 was applied to the rubber layer, with an electron beam irradiator "CURETRON EBC200-100 for industrial production" available from NISSHIN HIGH VOLTAGE Co., Ltd. to prepare a laminate. The interlayer peel strength of the vulcanized laminate was measured in accordance with the above-mentioned method. The results are shown in Table 1.

(3) Preparation of Tire

A pneumatic tire (195/65R15) as shown in FIG. 4 was prepared in the same manner as Examples 1 to 4. The gas barrier property and the presence of cracks of the obtained tire after drum test run were evaluated. The results are shown in Table 1.

TABLE 1

| | | Example 1 | Example 2 | Example 3 | Example 4 | Comparative Example 1 | Comparative Example 2 |
|---|---|---|---|---|---|---|---|
| Thermoplastic resin film-containing layer | The number of layers | | | | 5 | | |
| | Gas barrier property (index) | | | | 20 | | |
| Rubber layer component (part by mass) | ENR25[1] | 80 | — | 60 | — | — | — |
| | ENR50[2] | 20 | — | 20 | — | — | — |
| | ENR10[3] | — | 80 | — | 60 | — | — |
| | ENR60[4] | — | 20 | — | 20 | — | — |
| | NR(RSS#3) | — | — | 20 | — | 100 | — |
| | BR[5] | — | — | — | 20 | — | 100 |
| | Carbon black[6] | 30 | 30 | 30 | 30 | 30 | 30 |
| | Stearic acid | 1 | 1 | 1 | 1 | 1 | 1 |

TABLE 1-continued

|  |  | Example 1 | Example 2 | Example 3 | Example 4 | Comparative Example 1 | Comparative Example 2 |
|---|---|---|---|---|---|---|---|
|  | Zinc oxide | 3 | 3 | 3 | 3 | 3 | 3 |
|  | Tackifier resin[7] | 5 | 5 | 5 | 5 | 5 | 5 |
|  | Oil[10] | 20 | 20 | 25 | 30 | — | — |
|  | Antioxidant[8] | 1 | 1 | 1 | 1 | 1 | 1 |
|  | Vulcanization accelerator[9] | 1.5 | 1.5 | 1.5 | 1.5 | 1.5 | 1.5 |
|  | Sulfur | 1 | 1 | 1 | 1 | 1 | 1 |
| Rubber layer | $E_2'$ (Pa) | 9.0E+07 | 8.5E+07 | 6.0E+07 | 3.0E+07 | 2.0E+07 | 1.0E+07 |
|  | Tg (° C.) | −30 | −35 | −40 | −45 | −50 | −80 |
| Laminate | Peel strength (N/25 mm) | 20 | 21 | 17 | 18 | 4 | 5 |
| Tire | Cracks after drum test run | None | None | None | None | None | None |
|  | Separated films after drum test run | None | None | None | None | Some | Some |
|  | Gas barrier property (index) after drum test run | 18 | 17 | 19 | 19 | 100 | 110 |

Note:
[1] ENR25: Epoxidized natural rubber (product name: ENR25 available from RRIM) (epoxidation degree (epoxidation rate): 25% by mole)
[2] ENR50: Epoxidized natural rubber (product name: ENR50 available from RRIM Corp) (epoxidation degree (epoxidation rate): 50% by mole)
[3] ENR10: Epoxidized natural rubber (product name: ENR-10 available from Kumpulan Guthrie Berhad) (epoxidation degree (epoxidation rate): 10% by mole)
[4] ENR60: Epoxidized natural rubber (product name: ENR-60 available from MUANG MAI GUTHRIE) (epoxidation degree (epoxidation rate): 60% by mole)
[5] BR: BR01 available from JSR Co., Ltd
[6] Carbon black: SIEST NB available from TOKAI CARBON Co., Ltd.
[7] Tackifier resin: KORESIN available from BASF AKTIENGESELLS, based on phenol
[8] Antioxidant: Antigen 6C available from Sumitomo Chemical Co. Ltd., chemical name: N-phenyl-N'-1,3-dimethylbutyl-p-phenylenediamine
[9] Vulcanization accelerator: NOCCELER CZ-G available from OUCHI SHINKO CHEMICAL INDUSTRIAL CO., LTD., chemical name: N-cyclohexyl-2-benzothiazole sulfenamide
[10] Softener (oil) (TOP available from DAIHACHI CHEMICAL INDUSTRY CO., LTD.): 3 parts by mass Examples 5 to 8

Except for using a 21-layered film instead of a 5-layered film as the inner layer and using the components shown in Table 2, the preparation and the measurement were conducted in the same manner as Examples 1 to 4. The results are shown in Table 2.

Comparative Examples 3 to 4

Except for using a 21-layered film instead of a 5-layered film as the inner layer and using the components shown in Table 2, the preparation and the measurement were conducted in the same manner as Comparative Examples 1 to 2. The results are shown in Table 2.

TABLE 2

|  |  | Example 5 | Example 6 | Example 7 | Example 8 | Comparative Example 3 | Comparative Example 4 |
|---|---|---|---|---|---|---|---|
| Thermoplastic resin film-containing layer | The number of layers | | | | 21 | | |
|  | Gas barrier property (index) | | | | 5 | | |
| Rubber layer component (part by mass) | ENR25[1] | 80 | — | 60 | — | — | — |
|  | ENR50[2] | 20 | — | 20 | — | — | — |
|  | ENR10[3] | — | 80 | — | 60 | — | — |
|  | ENR60[4] | — | 20 | — | 20 | — | — |
|  | NR(RSS#3) | — | — | 20 | — | 100 | — |
|  | BR[5] | — | — | — | 20 | — | 100 |
|  | Carbon black[6] | 30 | 30 | 30 | 30 | 30 | 30 |
|  | Stearic acid | 1 | 1 | 1 | 1 | 1 | 1 |
|  | Zinc oxide | 3 | 3 | 3 | 3 | 3 | 3 |
|  | Tackifier resin[7] | 5 | 5 | 5 | 5 | 5 | 5 |
|  | Oil[10] | 20 | 20 | 25 | 30 | — | — |
|  | Antioxidant[8] | 1 | 1 | 1 | 1 | 1 | 1 |
|  | Vulcanization accelerator 9) | 1.5 | 1.5 | 1.5 | 1.5 | 1.5 | 1.5 |
|  | Sulfur | 1 | 1 | 1 | 1 | 1 | 1 |
| Rubber layer | $E_2'$ (Pa) | 9.0E+07 | 8.5E+07 | 6.0E+07 | 3.0E+07 | 2.0E+07 | 1.0E+07 |
|  | Tg (° C.) | −30 | −35 | −40 | −45 | −50 | −80 |
| Laminate | Peel strength (N/25 mm) | 20 | 21 | 17 | 18 | 4 | 5 |
| Tire | Cracks after drum test run | None | None | None | None | None | None |
|  | Separated films after drum test run | None | None | None | None | Some | Some |
|  | Gas barrier property (index) after drum test run | 3 | 2 | 4 | 4 | 100 | 110 |

Examples 9 to 12

Except for using the components shown in Table 3, the preparation and the measurement were conducted in the same manner as Examples 1 to 4. The results are shown in Table 3.

TABLE 3

|  |  | Example 9 | Example 10 | Example 11 | Example 12 |
|---|---|---|---|---|---|
| Thermoplastic resin film-containing layer | The number of layers | | | 5 | |
| | Gas barrier property (index) | | | 20 | |
| Rubber layer component (part by mass) | EBR (1) | 20 | 80 | 40 | — |
| | EBR (2) | 80 | 20 | 30 | 80 |
| | ENR10 | — | — | 30 | 20 |
| | Carbon black | 30 | 30 | 30 | 30 |
| | Antioxidant | 1 | 1 | 1 | 1 |
| | Stearic acid | 1 | 1 | 1 | 1 |
| | Oil | 10 | — | 5 | 10 |
| | Zinc oxide | 3 | 3 | 3 | 3 |
| | Sulfur | 1 | 1 | 1 | 1 |
| | Vulcanization accelerator (1) | 1.5 | 1.5 | 1.5 | 1.5 |
| Rubber layer | $E_2'$ (Pa) | 8.0E+07 | 5.5E+07 | 7.0E+07 | 8.5E+07 |
| | Tg (° C.) | −35 | −50 | −45 | −30 |
| Laminate | Peel strength (N/25 mm) | 25 | 22 | 23 | 25 |
| Tire | Cracks after drum test run | None | None | None | None |
| | Separated films after drum test run | None | None | None | None |
| | Gas barrier property (index) after drum test run | 18 | 19 | 17 | 18 |

The agents shown in Table 3 are as follows.
EBR (1)-(2): prepared in the above-mentioned preparation examples.
ENR10: the same as shown in Table 1
Carbon black: SHOWBLACK N220 available from Cabot Corporation (N2SA: 125 m$^2$/g)
Antioxidant: Nocrac 6C available from OUCHI SHINKO KAGAKU KOGYO Co., Ltd., chemical name: (N-1,3-dimethylbutyl)-N'-phenyl-p-phenylenediamine)
Stearic acid: available from NOF CORPORATION
Oil: Process oil PW-380 available from Idemitsu Kosan Co., Ltd.
Zinc oxide: Zinc oxide #1 available from MITSUI MINING AND SMELTING CO., LTD.
Sulfur: Powdery sulfur available from TSURUMI KAGAKU Co., Ltd.
Vulcanization accelerator (1): NOCCELER CZ-G (N-t-butyl-2-benzothiazolyl sulfenamide) available from OUCHI SHINKO CHEMICAL INDUSTRIAL CO., LTD.

Results

As shown in Table 1 (major component: ENR, 5 thermoplastic resin-containing layers), Examples 1 to 4 containing ENR in the rubber layer had no cracks or separated films after the drum test run of the tire and had excellent gas barrier property. In contrast, Comparative Examples 1 to 2 containing no ENR in the rubber layer had a separated film after the drum test run of the tire and had poor gas barrier property.

As shown in Table 2 (major component: ENR, 21 thermoplastic resin-containing layers), Examples 5 to 8 containing ENR in the rubber layer had no cracks or separated films after the drum test run of the tire and had excellent gas barrier property. In contrast, Comparative Examples 3 to 4 containing no ENR in the rubber layer had a separated film after the drum test run of the tire and had poor gas barrier property.

As shown in Table 3 (major component: EBR, 5 thermoplastic resin-containing layers), Examples 9 to 12 containing EBR in the rubber layer had no cracks or separated films after the drum test run of the tire and had excellent gas barrier property.

2. Second Embodiment

The present invention will be explained in more detail below with reference to examples, but the present invention is not limited to the examples. The method of evaluating the tires according to the respective examples will be explained first. Then, the preparation of the thermoplastic resin films used as the inner liner and the preparation of the tires will be explained.

The thermoplastic resin films used as the inner liner were prepared in accordance with the preparation processes described later, respectively. The tires were prepared by using a prepared thermoplastic resin film as the inner liner. The low temperature resistance of each tire was evaluated by the following method.

Evaluation Method

Evaluation of Low Temperature Resistance

The low temperature resistance (at −20° C.) of the tire was evaluated as follows. The tires prepared in accordance with the examples described later each were fixed on a standard rim specified in JATMA to conduct drum test run under the normal internal pressure and the normal load specified in JATMA.

The tires inflated at an internal air pressure of 140 kPa were pressed to a drum rotating at a driving speed of 80 km/h under a load of 6 kN and run 1,000 km at 23° C. or −20° C.

Presence of Cracks after Drum Test Run

The appearance of the inner liner of the tire after the drum running 1,000 km at −20° C. was visually observed to evaluate the presence of fractures and cracks.

Gas Barrier Property of Tire after Drum Test Run

Two sample pieces with a size of 10 cm×10 cm were cut out from the side face of the tire, subjected to humidity conditioning at 20° C. and 65% RH for 5 days to measure their oxygen transmission rates at 20° C. and 65% RH in accordance with the method described in JIS-K7126-2: 2006 (isopiestic method) with a "MOCON OX-TRAN2/20" available from MODERNCONTROLS, INC. The average of the oxygen transmission rates was determined (unit:

mL/m²·day·atm). The average is expressed with an index of 100 representing the average oxygen transmission rate of the multi-layered laminate of Comparative Example 8. A lower index value shows more excellent gas barrier property.

Evaluation of Weight of Tire

The tires of the examples and the comparative examples described later were weighed. The weights of these tires were expressed with an index of 100 representing the weight of Comparative Example 3. A lower index value shows a smaller weight of the tire.

Evaluation of Characteristics of Inner Liner

The content of ethylene and the saponification degree of each of the ethylene-vinyl alcohol copolymers used in the respective examples were calculated based on a spectrum obtained by the measurement of $^1$H-NMR [with a JNM-GX-500 type, available from NIPPON DENSHI Co., Ltd.] using deuterated dimethyl sulfoxide as the solvent. For the measurement of the melt flow rate (MFR) of the ethylene-vinyl alcohol copolymer, the sample was introduced into a cylinder having an inner diameter of 9.55 mm and a length of 162 mm of a MELT INDEXER L244 [available from TAKARA KOGYO Co., Ltd.] and melted at 190° C. The melted sample was subjected to a uniform load by using a plunger having a weight of 2,160 g and a diameter of 9.48 mm to be extruded from an orifice having a diameter of 2.1 mm formed at the center of the cylinder. The MFR was determined from the amount of the extruded resin per unit time (g/10 minutes). When the melting point of the ethylene-vinyl alcohol copolymer is around or more than 190° C., the MFR was determined at a plurality of temperatures higher than the melting point under a load of 2,160 g. The obtained data were plotted on a semi-logarithmic graph with the inverse of the absolute temperature as the horizontal axis and the logarithm of the determined MFR as the vertical axis, and the value obtained by extrapolation at 190° C. was determined as the melt flow rate (MFR) to be obtained.

Preparation of Laminate of Thermoplastic Resin Film Having 5-layer Structure

Through the use of an ethylene-vinyl alcohol copolymer (EVOH) (E205 available from KURARAY Co., Ltd) and a thermoplastic polyurethane (TPU) (KURAMIRON 3190 available from KURARAY Co., Ltd., a laminate of a 5-layered thermoplastic resin film (TPU/EVOH/TPU/EVOH/TPU layers) was prepared by coextrusion. The conditions for coextrusion are described below. The thicknesses of the layers are: TPU layer (C1): 2 µm, EVOH layer (C2): 20 µm, TPU layer (C3): 2 µm, EVOH layer (C4): 20 µm, TPU layer (C5): 10 µm.

Extrusion Temperatures of Resins: C1/C2/C3/C4/C5/Die=170/170/170/220/220/220° C.

Type of extruder for resins:
TPU: extruder 25 mmϕ, P25-18AC (available from OSAKA SEIKI KOSAKU Co., Ltd.)
EVOH: laboratory extruder 20 mmϕ (ME type), CO-EXT (available from TOYO SEIKI Co., Ltd.)
T-die: extruder (width: 500 mm) used for a 5-layered film containing two types of materials (available from PLASTIC KOGAKU KENKYUSHO Co., Ltd.)
Temperature of cooling roll: 50° C.
Speed of winding: 4 m/minute Preparation of Laminate of Thermoplastic Resin Film Having 21-Layer Structure Through the use of an ethylene-vinyl alcohol copolymer (EVOH) (E205 available from KURARAY Co., Ltd) and a thermoplastic polyurethane (TPU) (KURAMIRON 3190 available from KURARAY Co., Ltd., a laminate of a 21-layered thermoplastic resin film with a TPU layer and an EVOH layer being laminated alternatively and with the both ends being TPU layers (TPU/EVOH/TPU/ . . . EVOH/TPU layers) was prepared by coextrusion. The conditions for coextrusion are described below. The thickness of each TPU layer is 2 µm, and the thickness of each modified EVOH layer is 1 µm.

Extrusion temperatures of resins: 220° C.
Type of extruder for resins:
TPU: extruder 25 mmϕ, P25-18AC (available from OSAKA SEIKI KOSAKU Co., Ltd.)
EVOH: laboratory extruder 20 mmϕ (ME type), CO-EXT (available from TOYO SEIKI Co., Ltd.)
T-die: extruder (width: 500 mm) used for a 21-layered film containing two types of materials (available from PLASTIC KOGAKU KENKYUSHO Co., Ltd.)
Temperature of cooling roll: 50° C.
Speed of winding: 4 m/minute Dynamic storage modulus of inner liner The measured dynamic storage modulus at −20° C. of the inner liner was $5.9 \times 10^8$.

Preparation of Rubber Layer

Preparation Example 6

A rubber layer a was obtained based on the following components.
Natural rubber: 50 parts by mass
SBR (SBR1712 available from JSR Co., Ltd): 68.75 parts by mass
GPF N-660 (carbon black) (505 available from ASAHI CARBON Co., Ltd): 43 parts by mass
Softener (TOP available from DAIHACHI CHEMICAL INDUSTRY CO., LTD.): 50 parts by mass
Antioxidant (Nocrac224-S available from OUCHI SHINKO KAGAKU KOGYO Co., Ltd.): 1.5 parts by mass
Stearic acid (available from ASAHI DENKA KOGYO Co., Ltd): 1.5 parts by mass
Vulcanization accelerator (Accel M available from Kawaguchi Chemical Industry Co., LTD.): 0.5 parts by mass
Vulcanization accelerator (Accel CZ available from Kawaguchi Chemical Industry Co., LTD.): 1 part by mass
Zinc oxide (available from HIGHTECH): 4 parts by mass
Sulfur (available from KARUIZAWA SEIRENSHO Co., Ltd.): 2.66 parts by mass The measured dynamic storage modulus at −20° C. of the rubber layer a was $2 \times 10^5$.

Preparation Example 7

A rubber layer b was obtained based on the following components.
Natural rubber: 50 parts by mass
SBR (SBR1712 available from JSR Co., Ltd): 68.75 parts by mass
GPF N-660 (carbon black) (505 available from ASAHI CARBON Co., Ltd): 43 parts by mass
Softener (TOP available from DAIHACHI CHEMICAL INDUSTRY CO., LTD.): 25 parts by mass
Antioxidant (Nocrac224-S available from OUCHI SHINKO KAGAKU KOGYO Co., Ltd.): 1.5 parts by mass
Stearic acid (available from ASAHI DENKA KOGYO Co., Ltd): 1.5 parts by mass
Vulcanization accelerator (Accel M available from Kawaguchi Chemical Industry Co., LTD.): 0.5 parts by mass
Vulcanization accelerator (Accel CZ available from Kawaguchi Chemical Industry Co., LTD.): 1 part by mass
Zinc oxide (available from HIGHTECH): 4 parts by mass Sulfur (available from KARUIZAWA SEIRENSHO Co., Ltd.): 2.66 parts by mass The measured dynamic storage modulus at −20° C. of the rubber layer b was $2\times10^6$.

Preparation Example 8

A rubber layer c was obtained based on the following components.
Natural rubber: 50 parts by mass
SBR (SBR1712 available from JSR Co., Ltd): 68.75 parts by mass
GPF N-660 (carbon black) (50S available from ASAHI CARBON Co., Ltd): 43 parts by mass
Softener (TOP available from DAIHACHI CHEMICAL INDUSTRY CO., LTD.): 10 parts by mass
Antioxidant (Nocrac224-S available from OUCHI SHINKO KAGAKU KOGYO Co., Ltd.): 1.5 parts by mass
Stearic acid (available from ASAHI DENKA KOGYO Co., Ltd): 1.5 parts by mass
Vulcanization accelerator (Accel M available from Kawaguchi Chemical Industry Co., LTD.): 0.5 parts by mass
Vulcanization accelerator (Accel CZ available from Kawaguchi Chemical Industry Co., LTD.): 1 part by mass
Zinc oxide (available from HIGHTECH): 4 parts by mass
Sulfur (available from KARUIZAWA SEIRENSHO Co., Ltd.): 2.66 parts by mass The measured dynamic storage modulus at −20° C. of the rubber layer c was $9\times10^6$.

Comparative Preparation Example 1

A rubber layer d was obtained based on the following components.
Natural rubber: 30 parts by mass
SBR (SBR1712 available from JSR Co., Ltd): 80 parts by mass
GPF N-660 (carbon black) (50S available from ASAHI CARBON Co., Ltd): 43 parts by mass
Softener (TOP available from DAIHACHI CHEMICAL INDUSTRY CO., LTD.): 3 parts by mass
Antioxidant (Nocrac224-S available from OUCHI SHINKO KAGAKU KOGYO Co., Ltd.): 1.5 parts by mass
Stearic acid (available from ASAHI DENKA KOGYO Co., Ltd): 1.5 parts by mass
Vulcanization accelerator (Accel M available from Kawaguchi Chemical Industry Co., LTD.): 0.5 parts by mass
Vulcanization accelerator (Accel CZ available from Kawaguchi Chemical Industry Co., LTD.): 1 part by mass
Zinc oxide (available from HIGHTECH): 4 parts by mass
Sulfur (available from KARUIZAWA SEIRENSHO Co., Ltd.): 2.66 parts by mass The measured dynamic storage modulus at −20° C. of the rubber layer d was $4\times10^7$.

Preparation of Tire for Evaluation

Examples 13 to 18 and Comparative Examples 5 to 8

Example 13

The 5-layered laminate of the thermoplastic resin film was used as the inner liner. A tire A was prepared by using the rubber layer a prepared in the Preparation Example 6, the above-mentioned inner liner, and the above-mentioned carcass by a conventional method. Epoxidized natural rubber (ENR) was used as the adhesive layer bonding the rubber layer a to the above-mentioned inner liner. The ENR was prepared by mixing 75 parts by mass of ENR25 available from RRIM Corp (epoxidation degree (epoxidation rate): 25% by mole) with 25 parts by mass of ENR50 available from RRIM Corp (epoxidation degree (epoxidation rate): 50% by mole).

Example 14

The 5-layered laminate of the thermoplastic resin film was used as the inner liner. A tire B was prepared by using the rubber layer b prepared in the Preparation Example 7, the above-mentioned inner liner, and the above-mentioned carcass by a conventional method. The adhesive layer bonding the rubber layer b to the inner liner was the same as that of Example 13.

Example 15

The 5-layered laminate of the thermoplastic resin film was used as the inner liner. A tire C was prepared by using the rubber layer c prepared in the Preparation Example 8, the above-mentioned inner liner, and the above-mentioned carcass by a conventional method. The adhesive layer bonding the rubber layer c to the inner liner was the same as that of Example 13.

Example 16

The 21-layered laminate of the thermoplastic resin film was used as the inner liner. A tire D was prepared by using the rubber layer a prepared in the Preparation Example 6, the above-mentioned inner liner, and the above-mentioned carcass by a conventional method. The adhesive layer bonding the rubber layer a to the inner liner was the same as that of Example 13.

Example 17

The 21-layered laminate of the thermoplastic resin film was used as the inner liner. A tire E was prepared by using the rubber layer b prepared in the Preparation Example 7, the above-mentioned inner liner, and the above-mentioned carcass by a conventional method. The adhesive layer bonding the rubber layer b to the inner liner was the same as that of Example 13.

Example 18

The 21-layered laminate of the thermoplastic resin film was used as the inner liner. A tire F was prepared by using the rubber layer c prepared in the Preparation Example 8, the above-mentioned inner liner, and the above-mentioned carcass by a conventional method. The adhesive layer bonding the rubber layer c to the inner liner was the same as that of Example 13.

Comparative Example 5

The 5-layered laminate of the thermoplastic resin film was used as the inner liner. A tire G was prepared by using the rubber layer d prepared in the Comparative Preparation Example 1, the above-mentioned inner liner, and the above-mentioned carcass by a conventional method. The adhesive layer bonding the rubber layer d to the inner liner was the same as that of Example 13.

Comparative Example 6

The 21-layered laminate of the thermoplastic resin film was used as the inner liner. A tire H was prepared by using the rubber layer d prepared in the Comparative Preparation Example 1, the above-mentioned inner liner, and the above-mentioned carcass by a conventional method. The adhesive layer bonding the rubber layer d to the inner liner was the same as that of Example 13.

Comparative Example 7

An inner liner formed of a typical butyl rubber was used. A tire I was prepared by using the rubber layer b prepared in the preparation example 7, the typical inner liner, and the above-mentioned carcass by a conventional method. The adhesive layer bonding the rubber layer b to the butyl rubber inner liner was the same as that of Example 13.

Comparative Example 8

The 5-layered laminate of the thermoplastic resin film was used as the inner liner. A tire J was prepared by using the above-mentioned inner liner and the above-mentioned carcass by a conventional method. No rubber layers were used in this comparative example.

Evaluation Results

The results are shown in Table 4.

the inner liner after test run at −20° C. and had an index showing excellent gas barrier property.

3. Third Embodiment

The present invention will be explained in more detail below with reference to examples, but the present invention is not limited to the examples. The method of evaluating the tires according to the respective examples will be explained first. Then, the preparation of the thermoplastic resin films used as the inner liner and the preparation of the tires will be explained.

The thermoplastic resin films used as the inner liner were prepared in accordance with the preparation processes described later, respectively. The tires were prepared by using a prepared thermoplastic resin film as the inner liner. The low temperature resistance of each tire was evaluated by the following method.

Evaluation Method

Evaluation of Low Temperature Resistance

The low temperature resistance (at −20° C.) of the tire was evaluated as follows. The tires prepared in accordance with the examples described later each were fixed on a standard rim specified in JATMA to conduct drum test run under the normal internal pressure and the normal load specified in JATMA.

The tires inflated at an internal air pressure of 140 kPa were pressed to a drum rotating at a driving speed of 80 km/h under a load of 6 kN and run 1,000 km at 23° C. or −20° C.

TABLE 4

| | | | Example 13 | Example 14 | Example 15 | Example 16 | Example 17 |
|---|---|---|---|---|---|---|---|
| | Tire | | A | B | C | D | E |
| Rubber layer | Softener (part by mass) | | 50 | 25 | 10 | 50 | 25 |
| | Dynamic storage modulus (Pa) | | 2.00E+05 | 2.00E+06 | 9.00E+06 | 2.00E+05 | 2.00E+06 |
| | Thickness (mm) | | 0.1 | 0.4 | 0.9 | 0.1 | 0.4 |
| Adhesive layer | ENR (ENR25/ENR50) | | 75/25 | 75/25 | 75/25 | 75/25 | 75/25 |
| Inner liner | Thermoplastic resin film | The number of layers of laminate | 5 | 5 | 5 | 21 | 21 |
| | | Dynamic storage modulus (Pa) | 5.90E+08 | 5.90E+08 | 5.90E+08 | 4.60E+08 | 4.60E+08 |
| | Butyl rubber | Dynamic storage modulus (Pa) | — | — | — | — | — |
| Evaluation result | Weight of tire | | 92 | 95 | 98 | 92 | 95 |
| | Cracks after drum test run | | None | None | None | None | None |
| | Gas barrier property (index) | | 20 | 19 | 18 | 7 | 6 |

| | | | Example 18 | Comparative Example 5 | Comparative Example 6 | Comparative Example 7 | Comparative Example 8 |
|---|---|---|---|---|---|---|---|
| | Tire | | F | G | H | I | J |
| Rubber layer | Softener (part by mass) | | 10 | 3 | 3 | 25 | — |
| | Dynamic storage modulus (Pa) | | 9.00E+06 | 4.00E+07 | 4.00E+07 | 2.00E+06 | — |
| | Thickness (mm) | | 0.9 | 0.9 | 0.9 | 0.1 | — |
| Adhesive layer | ENR (ENR25/ENR50) | | 75/25 | 75/25 | 75/25 | 75/25 | — |
| Inner liner | Thermoplastic resin film | The number of layers of laminate | 21 | 5 | 21 | — | 5 |
| | | Dynamic storage modulus (Pa) | 4.60E+08 | 5.90E+08 | 4.60E+08 | — | 5.90E+08 |
| | Butyl rubber | Dynamic storage modulus (Pa) | — | — | — | 8.00E+07 | — |
| Evaluation result | Weight of tire | | 98 | 98 | 98 | 100 | 91 |
| | Cracks after drum test run | | None | Some | Some | None | Some |
| | Gas barrier property (index) | | 5 | 90 | 85 | 25 | 100 |

As shown in Table 4, the tires not formed of a rubber layer containing a modified diene polymer (Comparative Examples 5 and 6) and the tires not formed of a rubber layer (Comparative Example 8) were confirmed to have defects such as fractures and cracks in the inner liner after test run at −20° C. In contrast, the tires of Examples 13 to 18 were not confirmed to have defects such as fractures and cracks in Presence of Cracks after Drum Test Run The appearance of the inner liner of the tire after the drum running 1,000 km at −20° C. was visually observed to evaluate the presence of fractures and cracks.

Gas Barrier Property of Tire after Drum Test Run

Two sample pieces with a size of 10 cm×10 cm were cut out from the side face of the tire, subjected to humidity conditioning at 20° C. and 65% RH for 5 days to measure their oxygen transmission rates at 20° C. and 65% RH in accordance with the method described in JIS-K7126-2:2006 (isopiestic method) with a "MOCON OX-TRAN2/20" available from MODERNCONTROLS, INC. The average of the oxygen transmission rates was determined (unit: mL/m$^2$·day·atm) and expressed with an index of 100 representing the average of oxygen transmission rate of a sample of the multi-layered laminate obtained in Comparative Example 4. A lower index value shows more excellent gas barrier property.

Evaluation of Weight of Tire

The tires of the examples and the comparative examples described later were weighed. The weights of these tires were expressed with an index of 100 representing the weight of Comparative Example 3. A lower index value shows a smaller weight of the tire.

Evaluation of Characteristics of Inner Liner

The content of ethylene and the saponification degree of each of the ethylene-vinyl alcohol copolymers used in the respective examples were calculated based on a spectrum obtained by the measurement of $^1$H-NMR [with a JNM-GX-500 type, available from NIPPON DENSHI Co., Ltd.] using deuterated dimethyl sulfoxide as the solvent. For the measurement of the melt flow rate (MFR) of the ethylene-vinyl alcohol copolymer, the sample was introduced into a cylinder having an inner diameter of 9.55 mm and a length of 162 mm of a MELT INDEXER L244 [available from TAKARA KOGYO Co., Ltd.] and melted at 190° C. The melted sample was subjected to a uniform load by using a plunger having a weight of 2,160 g and a diameter of 9.48 mm to be extruded from an orifice having a diameter of 2.1 mm formed at the center of the cylinder. The MFR was determined from the amount of the extruded resin per unit time (g/10 minutes). When the melting point of the ethylene-vinyl alcohol copolymer is around or more than 190° C., the MFR was determined at a plurality of temperatures higher than the melting point under a load of 2,160 g. The obtained data were plotted on a semi-logarithmic graph with the inverse of the absolute temperature as the horizontal axis and the logarithm of the determined MFR as the vertical axis, and the value obtained by extrapolation at 190° C. was determined as the melt flow rate (MFR) to be obtained.

Preparation of Laminate of Thermoplastic Resin Film Having 5 Layer Structures

Through the use of an ethylene-vinyl alcohol copolymer (EVOH) (E205 available from KURARAY Co., Ltd) and a thermoplastic polyurethane (TPU) (KURAMIRON 3190 available from KURARAY Co., Ltd., a laminate of a 5-layered thermoplastic resin film (TPU/EVOH/TPU/EVOH/TPU layers) was prepared by coextrusion. The conditions for coextrusion are described below. The thicknesses of the layers are: TPU layer (C1): 2 μm, EVOH layer (C2): 20 μm, TPU layer (C3): 2 μm, EVOH layer (C4): 20 μm, TPU layer (C5): 10 μm.

Extrusion Temperatures of Resins: C1/C2/C3/C4/C5/Die=170/170/170/220/220/220° C.
Type of Extruder for Resins:
TPU: extruder 25 mmφ, P25-18AC (available from OSAKA SEIKI KOSAKU Co., Ltd.)
EVOH: laboratory extruder 20 mmφ (ME type), CO-EXT (available from TOYO SEIKI Co., Ltd.)
T-die: extruder (width: 500 mm) used for a 5-layered film containing two types of materials (available from PLASTIC KOGAKU KENKYUSHO Co., Ltd.)
Temperature of cooling roll: 50° C.
Speed of winding: 4 m/minute Preparation of Laminate of Thermoplastic Resin Film Having 21-layer Structures Through the use of an ethylene-vinyl alcohol copolymer (EVOH) (E205 available from KURARAY Co., Ltd) and a thermoplastic polyurethane (TPU) (KURAMIRON 3190 available from KURARAY Co., Ltd., a laminate of a 21-layered thermoplastic resin film with a TPU layer and an EVOH layer being laminated alternatively and with the both ends being TPU layers (TPU/EVOH/TPU/ . . . EVOH/TPU layers) was prepared by coextrusion. The conditions for coextrusion are described below. The thickness of each TPU layer is 2 μm, and the thickness of each modified EVOH layer is 1 μm.

Extrusion temperatures of resins: 220° C.
Type of extruder for resins:
TPU: extruder 25 mmφ, P25-18AC (available from OSAKA SEIKI KOSAKU Co., Ltd.)
EVOH: laboratory extruder 20 mmφ (ME type), CO-EXT (available from TOYO SEIKI Co., Ltd.)
T-die: extruder (width: 500 mm) used for a 21-layered film containing two types of materials (available from PLASTIC KOGAKU KENKYUSHO Co., Ltd.)
Temperature of cooling roll: 50° C.
Speed of winding: 4 m/minute Dynamic storage modulus of inner liner The measured dynamic storage modulus at −20° C. of the inner liner was $5.9 \times 10^8$.

Preparation of Rubber Layer

Preparation Example 9

The rubber layer a was obtained based on the following components.
Natural rubber: 50 parts by mass
SBR (SBR1712 available from JSR Co., Ltd): 68.75 parts by mass
GPF N-660 (carbon black) (50S available from ASAHI CARBON Co., Ltd): 43 parts by mass
Softener (TOP available from DAIHACHI CHEMICAL INDUSTRY CO., LTD.): 50 parts by mass
Antioxidant (Nocrac224-S available from OUCHI SHINKO KAGAKU KOGYO Co., Ltd.): 1.5 parts by mass
Stearic acid (available from ASAHI DENKA KOGYO Co., Ltd): 1.5 parts by mass
Vulcanization accelerator (Accel M available from Kawaguchi Chemical Industry Co., LTD.): 0.5 parts by mass
Vulcanization accelerator (Accel CZ available from Kawaguchi Chemical Industry Co., LTD.): 1 part by mass
Zinc oxide (available from HIGHTECH): 4 parts by mass
Sulfur (available from KARUIZAWA SEIRENSHO Co., Ltd.): 2.66 parts by mass The measured dynamic storage modulus at −20° C. of the rubber layer a was $2 \times 10^5$.

Preparation Example 10

The rubber layer b was obtained based on the following components.
Natural rubber: 50 parts by mass
SBR (SBR1712 available from JSR Co., Ltd): 68.75 parts by mass
GPF N-660 (carbon black) (50S available from ASAHI CARBON Co., Ltd): 43 parts by mass
Softener (TOP available from DAIHACHI CHEMICAL INDUSTRY CO., LTD.): 25 parts by mass
Antioxidant (Nocrac224-S available from OUCHI SHINKO KAGAKU KOGYO Co., Ltd.): 1.5 parts by mass Stearic acid (available from ASAHI DENKA KOGYO Co., Ltd): 1.5 parts by mass
Vulcanization accelerator (Accel M available from Kawaguchi Chemical Industry Co., LTD.): 0.5 parts by mass
Vulcanization accelerator (Accel CZ available from Kawaguchi Chemical Industry Co., LTD.): 1 part by mass
Zinc oxide (available from HIGHTECH): 4 parts by mass
Sulfur (available from KARUIZAWA SEIRENSHO Co., Ltd.): 2.66 parts by mass The measured dynamic storage modulus at −20° C. of the rubber layer b was $2\times10^6$.

Preparation Example 11

The rubber layer c was obtained based on the following components.
Natural rubber: 50 parts by mass
SBR (SBR1712 available from JSR Co., Ltd): 68.75 parts by mass
GPF N-660 (carbon black) (505 available from ASAHI CARBON Co., Ltd): 43 parts by mass
Softener (TOP available from DAIHACHI CHEMICAL INDUSTRY CO., LTD.): 10 parts by mass
Antioxidant (Nocrac224-S available from OUCHI SHINKO KAGAKU KOGYO Co., Ltd.): 1.5 parts by mass
Stearic acid (available from ASAHI DENKA KOGYO Co., Ltd): 1.5 parts by mass
Vulcanization accelerator (Accel M available from Kawaguchi Chemical Industry Co., LTD.): 0.5 parts by mass
Vulcanization accelerator (Accel CZ available from Kawaguchi Chemical Industry Co., LTD.): 1 part by mass
Zinc oxide (available from HIGHTECH): 4 parts by mass
Sulfur (available from KARUIZAWA SEIRENSHO Co., Ltd.): 2.66 parts by mass The measured dynamic storage modulus at −20° C. of the rubber layer c was $9\times10^6$.

Comparative Preparation Example 3

The rubber layer d was obtained based on the following components.
Natural rubber: 30 parts by mass
SBR (SBR1712 available from JSR Co., Ltd): 80 parts by mass
GPF N-660 (carbon black) (505 available from ASAHI CARBON Co., Ltd): 43 parts by mass
Softener (TOP available from DAIHACHI CHEMICAL INDUSTRY CO., LTD.): 3 parts by mass
Antioxidant (Nocrac224-S available from OUCHI SHINKO KAGAKU KOGYO Co., Ltd.): 1.5 parts by mass
Stearic acid (available from ASAHI DENKA KOGYO Co., Ltd): 1.5 parts by mass
Vulcanization accelerator (Accel M available from Kawaguchi Chemical Industry Co., LTD.): 0.5 parts by mass
Vulcanization accelerator (Accel CZ available from Kawaguchi Chemical Industry Co., LTD.): 1 part by mass
Zinc oxide (available from HIGHTECH): 4 parts by mass
Sulfur (available from KARUIZAWA SEIRENSHO Co., Ltd.): 2.66 parts by mass The measured dynamic storage modulus at −20° C. of the rubber layer d was $4\times10^7$.

Preparation of Tire

Examples 19 to 24 and Comparative Examples 9 to 12

Example 19

The 5-layered laminate of the thermoplastic resin film was used as the inner liner.

A tire A was prepared by using the rubber layer a prepared in the Preparation Example 9, the above-mentioned inner liner, and the above-mentioned carcass by a conventional method. Epoxidized natural rubber (ENR) was used as the adhesive layer bonding the rubber layer a to the above-mentioned inner liner. The ENR was prepared by mixing 75 parts by mass of ENR25 available from RRIM Corp (epoxidation degree (epoxidation rate): 25% by mole) with 25 parts by mass of ENR50 available from RRIM Corp (epoxidation degree (epoxidation rate): 50% by mole).

In Examples 19 to 24 and Comparative Examples 9 to 12, the rubber layer was disposed in a region excluding the central region in the tread width direction of the tread part but including regions each between a first part as a part of the carcass corresponding to tread ends and a second part where the interval between parts of the carcass in the respective side wall parts facing each other is maximized. The rubber layer is disposed so that it covers 70% or less of the area of the inner liner from the sectional view in the tire radial direction and the tread width direction.

Example 20

The 5-layered laminate of the thermoplastic resin film was used as the inner liner. A tire B was prepared by using the rubber layer b prepared in the Preparation Example 10, the above-mentioned inner liner, and the above-mentioned carcass by a conventional method. The adhesive layer bonding the rubber layer b to the inner liner was the same as that of Example 19.

Example 21

The 5-layered laminate of the thermoplastic resin film was used as the inner liner. A tire C was prepared by using the rubber layer c prepared in the Preparation Example 11, the above-mentioned inner liner, and the above-mentioned carcass by a conventional method. The adhesive layer bonding the rubber layer c to the inner liner was the same as that of Example 19.

Example 22

The 21-layered laminate of the thermoplastic resin film was used as the inner liner. A tire D was prepared by using the rubber layer a prepared in the Preparation Example 9, the above-mentioned inner liner, and the above-mentioned carcass by a conventional method. The adhesive layer bonding the rubber layer a to the inner liner was the same as that of Example 19.

Example 23

The 21-layered laminate of the thermoplastic resin film was used as the inner liner. A tire E was prepared by using the rubber layer b prepared in the Preparation Example 10, the above-mentioned inner liner, and the above-mentioned carcass by a conventional method. The adhesive layer bonding the rubber layer b to the inner liner was the same as that of Example 19.

Example 24

The 21-layered laminate of the thermoplastic resin film was used as the inner liner. A tire F was prepared by using the rubber layer c prepared in the Preparation Example 11, the above-mentioned inner liner, and the above-mentioned carcass by a conventional method. The adhesive layer bonding the rubber layer c to the inner liner was the same as that of Example 19.

Comparative Example 9

The 5-layered laminate of the thermoplastic resin film was used as the inner liner. A tire G was prepared by using the rubber layer d prepared in the Comparative Preparation Example 3, the above-mentioned inner liner, and the above-mentioned carcass by a conventional method. The adhesive layer bonding the rubber layer d to the inner liner was the same as that of Example 19.

Comparative Example 12

The 5-layered laminate of the thermoplastic resin film was used as the inner liner. A tire J was prepared by using the above-mentioned inner liner and the above-mentioned carcass by a conventional method. No rubber layers were used in this comparative example.

Evaluation Results

The results are shown in Table 5.

TABLE 5

|  |  | Example 19 | Example 20 | Example 21 | Example 22 | Example 23 |
|---|---|---|---|---|---|---|
|  | Tire | A | B | C | D | E |
| Rubber layer | Area covered by rubber layer Rubber layer/Inner liner (%) | 70 | 70 | 70 | 70 | 70 |
|  | Softener (part by mass) | 50 | 25 | 10 | 50 | 25 |
|  | Dynamic storage modulus (Pa) | 2.00E+05 | 2.00E+06 | 9.00E+06 | 2.00E+05 | 2.00E+06 |
|  | Thickness (mm) | 0.1 | 0.4 | 0.9 | 0.1 | 0.4 |
| Adhesive layer | ENR (ENR25/ENR50) | 75/25 | 75/25 | 75/25 | 75/25 | 75/25 |
| Inner liner | Thermoplastic resin film — The number of layers of laminate | 5 | 5 | 5 | 21 | 21 |
|  | Dynamic storage modulus (Pa) | 5.90E+08 | 5.90E+08 | 5.90E+08 | 4.60E+08 | 4.60E+08 |
|  | Butyl rubber — Dynamic storage modulus (Pa) | — | — | — | — | — |
| Evaluation result | Weight of tire | 91 | 94 | 97 | 91 | 94 |
|  | Cracks after drum test run | None | None | None | None | None |
|  | Gas barrier property (index) | 20 | 19 | 18 | 7 | 6 |

|  |  | Example 24 | Comparative Example 9 | Comparative Example 10 | Comparative Example 11 | Comparative Example 12 |
|---|---|---|---|---|---|---|
|  | Tire | F | G | H | I | J |
| Rubber layer | Area covered by rubber layer Rubber layer/Inner liner (%) | 70 | 70 | 70 | 70 | — |
|  | Softener (part by mass) | 10 | 3 | 3 | 25 | — |
|  | Dynamic storage modulus (Pa) | 9.00E+06 | 4.00E+07 | 4.00E+07 | 2.00E+06 | — |
|  | Thickness (mm) | 0.9 | 0.9 | 0.9 | 0.1 | — |
| Adhesive layer | ENR (ENR25/ENR50) | 75/25 | 75/25 | 75/25 | 75/25 | — |
| Inner liner | Thermoplastic resin film — The number of layers of laminate | 21 | 5 | 21 | — | 5 |
|  | Dynamic storage modulus (Pa) | 4.60E+08 | 5.90E+08 | 4.60E+08 | — | 5.90E+08 |
|  | Butyl rubber — Dynamic storage modulus (Pa) | — | — | — | 8.00E+07 | — |
| Evaluation result | Weight of tire | 97 | 97 | 97 | 100 | 90 |
|  | Cracks after drum test run | None | Some | Some | None | Some |
|  | Gas barrier property (index) | 5 | 90 | 85 | 25 | 100 |

Comparative Example 10

The 21-layered laminate of the thermoplastic resin film was used as the inner liner. A tire H was prepared by using the rubber layer d prepared in the Comparative Preparation Example 3, the above-mentioned inner liner, and the above-mentioned carcass by a conventional method. The adhesive layer bonding the rubber layer d to the inner liner was the same as that of Example 19.

Comparative Example 11

An inner liner formed of a typical butyl rubber was used. A tire I was prepared by using the rubber layer b prepared in the Preparation Example 10, the typical inner liner, and the above-mentioned carcass by a conventional method. The adhesive layer bonding the rubber layer b to the butyl rubber inner liner was the same as that of Example 19.

As shown in Table 5, the tires not formed of a rubber layer containing a modified diene polymer and the tires not formed of a rubber layer were confirmed to have defects such as fractures and cracks in the inner liner after test run at −20° C. In contrast, the tires of Examples 1 to 6 were not confirmed to have defects such as fractures and cracks in the inner liner after test run at −20° C. and had an index showing excellent gas barrier property.

Preparation of Tire

Examples 25 to 28 and Comparative Examples 13 to 16

The area covered by the rubber layer a applied to the tire A of Example 19 was changed, and the weight of the tire, the presence of crack, and the gas barrier property were measured by the above-mentioned method.

Example 25

The rubber layer a applied to the tire A was disposed so that it covered 60% of the area of the inner liner from the sectional view in the tire radial direction and the tread width direction.

Example 26

The rubber layer a applied to the tire A was disposed so that it covered 50% of the area of the inner liner from the sectional view in the tire radial direction and the tread width direction.

Example 27

The rubber layer a applied to the tire A was disposed so that it covered 40% of the area of the inner liner from the sectional view in the tire radial direction and the tread width direction.

Example 28

The rubber layer a applied to the tire A was disposed so that it covered 30% of the area of the inner liner from the sectional view in the tire radial direction and the tread width direction.

Example 29

The rubber layer a applied to the tire A was disposed so that it covered 20% of the area of the inner liner from the sectional view in the tire radial direction and the tread width direction.

Example 30

The rubber layer a applied to the tire A was disposed so that it covered 10% of the area of the inner liner from the sectional view in the tire radial direction and the tread width direction.

Example 31

The rubber layer a applied to the tire A was disposed so that it covered 80% of the area of the inner liner from the sectional view in the tire radial direction and the tread width direction.

Example 32

The rubber layer a applied to the tire A was disposed so that it covered 90% of the area of the inner liner from the sectional view in the tire radial direction and the tread width direction.

As shown in Table 6, it is found that setting the rubber layer a to cover 70% or less of the area of the inner liner from the sectional view in the tire radial direction and the tread width direction can further decrease the weight of the tire without the durability in the low-temperature environment of −20° C. or less being impaired. It is also found that setting the rubber layer a to cover 20% or less of the area of the inner liner causes cracks in the inner liner and decreases the gas barrier property. Moreover, It is also found that setting the rubber layer a to cover 80% or 90% of the area of the inner liner increase the weight of the tire.

REFERENCE NUMERALS 1 bead core
2 carcass
3 inner liner
4 belt part
5 tread part
6 side wall part
7 rubber layer
9 pneumatic tire
10 laminate
11 thermoplastic resin film-containing layer
12 rubber layer
101 tire
111,112 bead core
113,114 bead filler
115 carcass
116 inner liner
117 rubber layer
118 belt layer
119 belt reinforcement layer
121 tread part
122 side wall part
131 adhesive layer
200 film application device
201 supply conveyer
202 resin film roll support axis
203 lined sheet peeler
204 lined sheet winding drum
205 pressing roller
206 film cutting means
207 resin film roll
221 continuum
301 tire
302 bead part
303 side wall part
304 tread part
305 tire shoulder part
311,312 bead core
313,314 bead filler
315 carcass
316 inner liner

TABLE 6

| | | Example 19 | Example 25 | Example 26 | Example 27 | Example 28 | Example 29 | Example 30 | Example 31 | Example 32 |
|---|---|---|---|---|---|---|---|---|---|---|
| | Tire | A | A | A | A | A | A | A | A | A |
| Rubber layer | Area covered by rubber layer Rubber layer/Inner liner (%) | 70 | 60 | 50 | 40 | 30 | 20 | 10 | 80 | 90 |
| Evaluation result | Weight of tire/Weight of Tire A of Example 1 (index) | 100 | 99 | 98 | 97 | 96 | 95 | 90 | 110 | 120 |
| | Cracks after drum test run | None | None | None | None | None | Some | Some | None | None |
| | Gas barrier property (index) | 20 | 21 | 22 | 23 | 24 | 104 | 105 | 19 | 18 |

317 rubber layer
318 belt layer
319 belt reinforcement layer
331 adhesive layer
381 belt end

The invention claimed is:

1. A laminate comprising: a thermoplastic resin film-containing layer and a rubber layer, wherein the rubber layer contains a modified diene polymer, and wherein
the rubber layer contains two or more kinds of modified diene polymers with different modification rates, the modified diene polymers is one kind or two or more kinds selected from an epoxidized natural rubber and an epoxidized polybutadiene rubber, the different modification rates contain at least two kinds of 5 to 30% by mole and 40 to 90% by mole, and the thermoplastic resin film-containing layer has a laminated structure of a thermoplastic resin film and a thermoplastic elastomer layer; and the rubber layer is disposed between a carcass in tire and the thermoplastic resin film-containing layer,
the thermoplastic resin film comprises an ethylene-vinyl alcohol copolymer;
the elastomer layer comprises an a thermoplastic polyurethane elastomer; and
the thermoplastic resin film-containing layer is a multilayer structure formed of 21 or more layers.

2. The laminate according to claim 1, wherein the rubber layer has a dynamic storage modulus E' at −20° C. of $1.0 \times 10^5$ to $1.0 \times 10^8$ Pa.

3. The laminate according to claim 1, wherein the rubber layer has a thickness of 0.1 to 30 mm.

4. The laminate according to claim 1, wherein the modified diene polymer has a glass transition temperature of 0° C. or less.

5. A tire comprising a laminate according to claim 1 as an inner liner.

6. The tire according to claim 5 comprising: a carcass, an inner liner having a thermoplastic resin film, a rubber layer disposed between the carcass and the inner liner, an adhesive layer bonding the inner liner to the rubber layer, wherein the rubber layer has a dynamic storage modulus E' at −20° C. of $1.0 \times 10^5$ to $1.0 \times 10^7$ Pa and a thickness of 0.1 to 1 mm.

7. The tire according to claim 6 comprising:
a pair of bead parts abutting a rim;
a pair of side wall parts stretched to the respective bead parts, the side wall parts facing each other;
a tread part holding the road;
a tire shoulder part having a contact with the side wall part and stretching from the tread end on the outside in the width direction of the tread part to the inside in the tire radial direction of the tread part;
a carcass formed in horseshoe shape between the pair of bead parts and disposed on the other side different from the road side of the tread part;
a belt layer disposed between the carcass and the tread part;
an inner liner having a thermoplastic resin film, the inner liner being disposed on the other side different from the road side of the carcass; and a rubber layer disposed between the carcass and the inner liner, wherein
the rubber layer is disposed in a region excluding the central region in the tread width direction of the tread part but including regions each between a first part as a part of the carcass corresponding to a belt end located on an outermost side in the tread width direction of the belt layer and a second part where the interval between parts of the carcass in the respective side wall parts facing each other is maximized.

8. The tire according to claim 7, wherein the rubber layer covers 70% or less of the area of the inner liner from the sectional view in the tire radial direction and the tread width direction.

9. The tire according to claim 8, wherein the rubber layer covers 50% or less of the area of the inner liner from the sectional view in the tire radial direction and the tread width direction.

10. The tire according to claim 6, wherein the dynamic storage modulus at −20° C. of the thermoplastic resin film forming the inner liner is defined as $E_1'$, the dynamic storage modulus at −20° C. of the rubber layer is defined as $E_2'$, and the dynamic storage modulus at −20° C. of the adhesive layer is defined as $E_4'$, the moduluses have the following relationship:

$E_1' > E_4' > E_2'$, and the dynamic storage modulus $E_1'$ is $1 \times 10^8$ to $1 \times 10^9$ Pa.

11. The tire according to claim 10, wherein the dynamic storage modulus $E_1'$ is $2 \times 10^8$ to $8 \times 10^8$ Pa.

12. The tire according to claim 11, wherein the dynamic storage modulus $E_1'$ is $4 \times 10^8$ to $6 \times 10^8$ Pa.

13. The tire according to claim 5, wherein the rubber layer contains a diene rubber, and the diene rubber is an unmodified diene rubber.

14. The tire according to claim 5, wherein the rubber layer contains a softener in a content of 5 to 50 parts by mass based on 100 parts by mass of a rubber component.

15. A method of producing a pneumatic tire, comprising: wrapping the laminate according to claim 1 around a tire molding drum so that the rubber layer is disposed on the outside; further wrapping a member for a tire around the laminate; removing the molding drum to obtain a green tire; and vulcanizing the green tire by heating to obtain a pneumatic tire.

* * * * *